(12) United States Patent
Yamada et al.

(10) Patent No.: US 11,908,199 B2
(45) Date of Patent: Feb. 20, 2024

(54) IN-VEHICLE ELECTRONIC CONTROL DEVICE

(71) Applicant: HITACHI AUTOMOTIVE SYSTEMS, LTD., Hitachinaka (JP)

(72) Inventors: Tetsuya Yamada, Tokyo (JP); Teppei Hirotsu, Tokyo (JP); Tomohito Ebina, Hitachinaka (JP); Kazuyoshi Serizawa, Hitachinaka (JP); Shouji Muramatsu, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 574 days.

(21) Appl. No.: 17/254,527

(22) PCT Filed: Jun. 3, 2019

(86) PCT No.: PCT/JP2019/021907
§ 371 (c)(1),
(2) Date: Dec. 21, 2020

(87) PCT Pub. No.: WO2020/003903
PCT Pub. Date: Jan. 2, 2020

(65) Prior Publication Data
US 2021/0248395 A1     Aug. 12, 2021

(30) Foreign Application Priority Data
Jun. 29, 2018   (JP) ................ 2018-125507

(51) Int. Cl.
*G06V 20/58*     (2022.01)
*B60W 30/08*    (2012.01)

(52) U.S. Cl.
CPC ............ *G06V 20/58* (2022.01); *B60W 30/08* (2013.01); *B60W 2420/403* (2013.01); *B60W 2420/52* (2013.01)

(58) Field of Classification Search
CPC ....... B60W 2420/403; B60W 2420/52; B60W 30/08; G01S 7/2955; G01S 13/867;
(Continued)

(56) References Cited

U.S. PATENT DOCUMENTS

2005/0275721 A1   12/2005  Ishii
2008/0089557 A1*   4/2008  Iwaki ................... G01C 3/06
                                                          382/106
2018/0120857 A1*   5/2018  Kappauf ............ G06V 20/582

FOREIGN PATENT DOCUMENTS

CN    107333097 A    11/2017
CN    108021862 A     5/2018
(Continued)

OTHER PUBLICATIONS

International Search Report with English translation and Written Opinion issued in corresponding application No. PCT/JP2019/021907 dated Oct. 1, 2019.
(Continued)

*Primary Examiner* — Ruiping Li
(74) *Attorney, Agent, or Firm* — Foley & Lardner LLP

(57) ABSTRACT

Image data captured from a traveling vehicle is considered, and it is not possible to reduce the transmission band of the image data. It is assumed that a radar 4 mounted in a traveling vehicle 10 detects a certain distant three-dimensional object at a time T in a direction of a distance d1 [m] and an angle θ1. Since the vehicle 10 travels at a vehicle speed Y [km/h], it is predicted that a camera 3 is capable of capturing the distant three-dimensional object at a time (T+ΔT) and an angle φ1 or at a distance d2 [m]. Therefore, if a control unit 2 outputs a request to the camera 3 in advance, so as to cut out an image of the angle φ1 or the distance d2 [m] at the time (T+ΔT), when the time (T+ΔT) comes, the camera 3 transfers a whole image and a high-
(Continued)

resolution image being a cutout image of only a partial image, to the control unit 2.

9 Claims, 22 Drawing Sheets

(58) Field of Classification Search
CPC ......... G01S 13/931; G01S 2013/93271; G01S 7/417; G01C 21/3602; G06V 20/58; G08G 1/165; G08G 1/166
See application file for complete search history.

(56) References Cited

FOREIGN PATENT DOCUMENTS

| | | |
|---|---|---|
| JP | H08-50696 A | 2/1996 |
| JP | 2004-122805 A | 4/2004 |
| JP | 2006-033793 A | 2/2006 |
| JP | 2015-041820 A | 3/2015 |
| WO | WO-2016/038949 A1 | 3/2006 |

OTHER PUBLICATIONS

Office Action issued in corresponding CN Application No. 201980031706.5 dated Jun. 24, 2022 (23 pages).
Office Action issued in corresponding JP Application No. 2018-125507 dated Jun. 28, 2022 (7 pages).

* cited by examiner

RADAR COORDINATE SYSTEM

CAMERA COORDINATE SYSTEM

FIG. 8

| DISTANCE | WIDTH (NUMBER OF PIXELS) |
|---|---|
| d1 | w1 |
| d2 | w2 |
| d3 | w3 |
| d4 | w4 |
| d5 | w5 |

RADAR COORDINATE SYSTEM

WIDTH w
TIME T
DISTANCE d
θ1

CAMERA COORDINATE SYSTEM

PARALLAX IMAGE DISTANCE
TIME T+ΔT
DISTANCE (d2+Δd)
DISTANCE (d2)
w'
DISTANCE (d2−Δd)
φ1

*FIG. 21*

| FRAME NUMBER | 100 → 101 | | | |
|---|---|---|---|---|
| ID | ANGLE | DISTANCE | SCREEN COORDINATES | SCREEN SIZE |
| 81 | θ1→ θ1' | d1→ d1' | (1600,300) → (1550, 100) | 20 x 20 → 22 x 22 |
| 82 | θ2→ θ2' | d2→ d2' | (1200, 500) → (1150, 300) | 70 x 30 → 72 x 32 |
| 83 | θ3→ θ3' | d3→ d3' | (1500, 820) → (1450, 620) | 50 x 50 → 54 x 54 |
| 84 | θ4→ θ4' | d4→ d4' | (2500,700) → (2550, 500) | 40 x 60 → 50 x 70 |
| 85 | θ5→ θ5' | d5→ d5' | (900, 1500) → (850, 1300) | 300 x 250 → 320 x 270 |
| 86 | θ6→ θ6' | d6→ d6' | (600, 1200) → (550, 1000) | 100 x 300 → 115 x 315 |
| 87 | NONE→ θ7 | NONE→ d7 | NONE → (1000, 600) | NONE → 50 x 100 |

IN-VEHICLE ELECTRONIC CONTROL DEVICE

TECHNICAL FIELD

The present invention relates to an in-vehicle electronic control device.

BACKGROUND ART

In a vehicle such as an automobile, a camera is installed, and an in-vehicle electronic control device that performs autonomous driving support and the like based on image data captured by the camera is widespread.

In such an in-vehicle electronic control device, the image data captured by the camera is taken into a control unit in a form of image data before change to an image format such as JPEG, that is, in a form of image data being raw data itself. Thus, the control unit integrates recognition processing by a plurality of sensors to improve recognition accuracy and the real-time performance. On the other hand, when the raw data is input to the control unit, the raw data is transferred between the camera and the control unit. Thus, in a case of uncompressed raw data of 30 fps with a 4K camera, a transmission bandwidth of several hundred MB/sec is required. Therefore, an expensive cable, an expensive communication transceiver LSI, or a communication controller LSI is used as an interface between the camera and the control unit. Furthermore, the cameras are being developed for higher resolutions such as 8K.

PTL 1 discloses a device in which the transmission capacity is reduced by transmitting a partial image after transmitting a low-resolution whole image.

CITATION LIST

Patent Literature

PTL 1: JP 2006-33793 A

SUMMARY OF INVENTION

Technical Problem

In PTL 1, image data captured from a traveling vehicle is considered, and it is not possible to reduce the transmission band of the image data.

Solution to Problem

According to the present invention, an in-vehicle electronic control device includes a sensor that detects a three-dimensional object, a control unit that obtains a position of the three-dimensional object at a predetermined time that has elapsed from a time when the sensor detects the three-dimensional object, when a vehicle travels, and an image capturing device that outputs image data obtained by capturing an image of the three-dimensional object to the control unit at the position and the predetermined time.

According to the present invention, an in-vehicle electronic control device includes an image capturing device that captures an image of a three-dimensional object, and a control unit that performs recognition processing based on image data of the three-dimensional object captured by the image capturing device. The image capturing device recognizes the three-dimensional object while a vehicle travels, manages image data of the recognized three-dimensional object with a corresponding identification number, when the control unit performs a notification of the identification number, generates a partial image of the three-dimensional object, which corresponds to the identification number and has a high resolution, and outputs the generated image data and the identification number to the control unit. The control unit notifies the image capturing device of the identification number of the image data required for the recognition processing.

Advantageous Effects of Invention

According to the present invention, it is possible to reduce a transmission band in transmission of image data captured from a traveling vehicle and to reduce system cost without a need for an expensive cable or an expensive communication component.

BRIEF DESCRIPTION OF DRAWINGS

FIG. 8 is a diagram illustrating an example of a table of a distance and a pixel width of a camera image in the first embodiment.

FIG. 21 is a diagram illustrating an example of a recognition management table in the third embodiment.

DESCRIPTION OF EMBODIMENTS

First Embodiment

Hereinafter, a first embodiment will be described with reference to the drawings.

In the first embodiment, in order to achieve an object of how to reduce a transmission band of raw data between a camera 3 and a control unit 2, an in-vehicle electronic control device that uses information of a sensor other than the camera 3, for example, using a radar 4 to specify necessary data and reduce the transmission band will be described.

Figure 1:
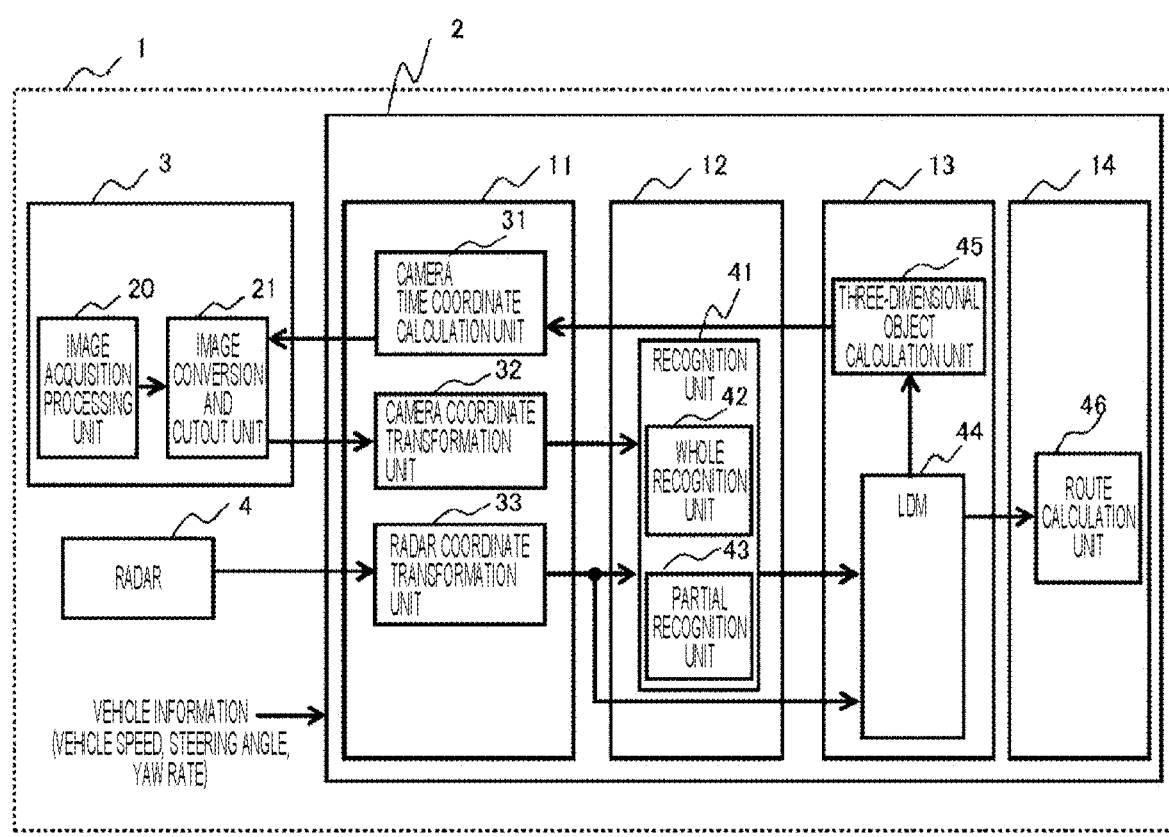
FIG. 1 is a block diagram illustrating a configuration of a vehicle equipped with an in-vehicle electronic control device according to a first embodiment.

FIG. 1 is a block diagram illustrating a configuration of a vehicle equipped with an in-vehicle electronic control device 1 according to a first embodiment. The in-vehicle electronic control device 1 includes the control unit 2, the camera 3, and the radar 4. The camera 3 is a high-resolution image capturing device, and may be either a stereo camera or a single-lens camera. The radar 4 maybe either a front radar, a side radar, or both. In addition, the radar may be any sensor other than the camera 3 given as an example. The radar is not limited to a millimeter wave radar and may be a lidar.

The control unit 2 includes a sensor interface unit 11, an integrated recognition unit 12, an analyzing unit 13, and a route planning unit 14. Vehicle information such as vehicle speed, a steering angle, and a yaw rate is input to the control unit 2.

The sensor interface unit 11 performs input and output with the camera 3 and the radar 4. Raw data is output from the camera 3, and a camera coordinate transformation unit 32 calculates a position of a cutout partial image in a global coordinate system of the control unit 2. For example, if the distance and the angle are output from the stereo camera in the partial image, the location in the global coordinate system can be calculated from the distance and the direction of the angle in the camera coordinates. If the single-lens camera has no distance information, the direction is output from the camera 3, but the distance is not output. Thus, the location cannot be uniquely specified on the global coordinate system. The radar 4 outputs object data after detection, and a radar coordinate transformation unit 33 transforms the object data from a coordinate system of the radar 4 to the global coordinate system of the control unit 2. A camera time coordinate calculation unit 31 transforms a vehicle coordinate system into a coordinate system of the camera 3 as described later.

The integrated recognition unit 12 causes the recognition unit 41 to perform recognition processing. The recognition unit 41 includes a whole recognition unit 42 that recognizes the whole image and a partial recognition unit 43 that recognizes the partial image. The recognition unit performs recognition using machine learning. The partial recognition unit 43 performs character recognition and the like using a high-resolution partial image, and may be configured using a deep neural network (DNN). The whole recognition unit 42 performs recognition processing of the whole image. The recognition accuracy of the camera 3 is improved using the object information of the radar 4 by making the coordinate systems of both the recognition result of the whole image of the camera 3 and the recognition result of the radar 4 common to the global coordinate system.

The analyzing unit 13 includes a local dynamic map (LDM) 44 and a three-dimensional object calculation unit 45. The local dynamic map is for mapping the recognition result of the radar 4, coordinate information of the recognition result of the recognition unit 41 with map information. The three-dimensional object calculation unit selects data to be cut out as a high-resolution data by the camera 3 and calculates the coordinates and the time of the selected data in a vehicle coordinate system.

A route calculation unit 46 in the route planning unit 14 performs safety region calculation and route calculation based on the LDM 44, and the calculated information is used for autonomous driving support.

Figure 2:
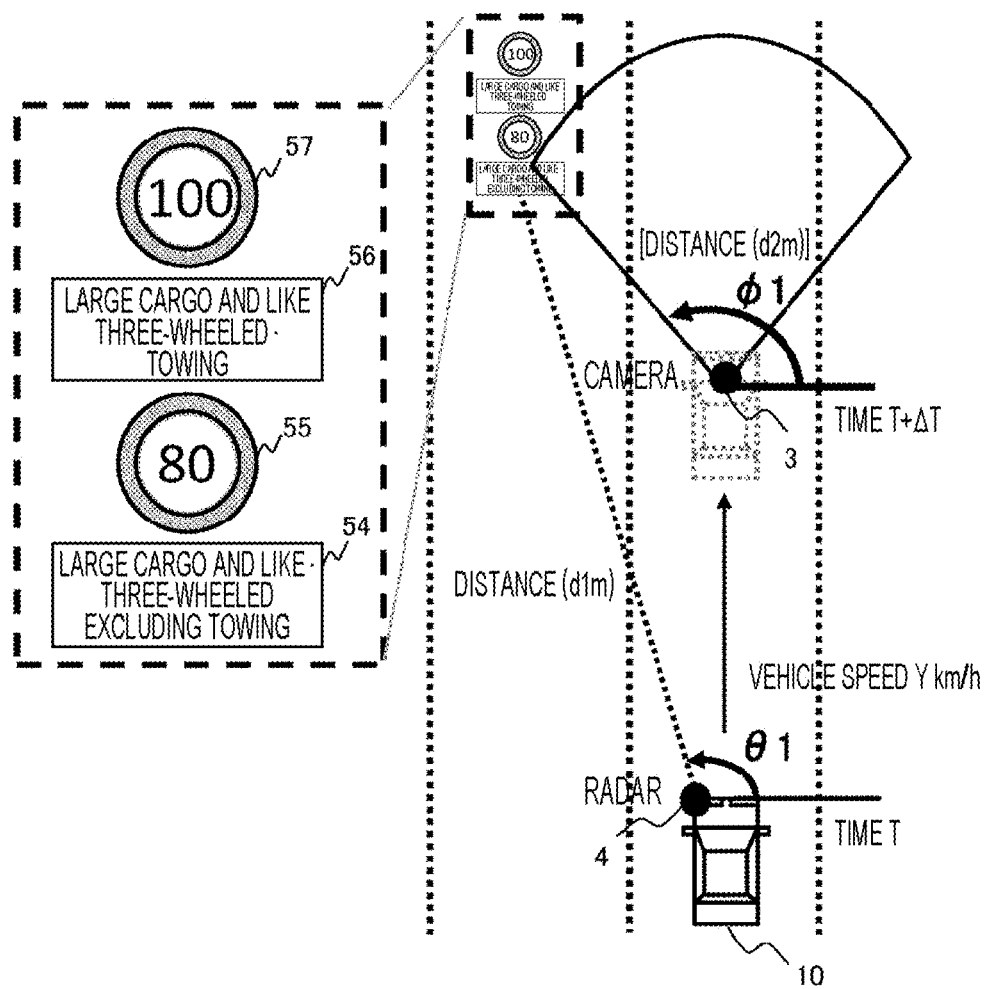
FIG. 2 is a diagram illustrating an example of recognizing a sign from a traveling vehicle.

FIG. 2 is a diagram illustrating an example of recognizing a sign from a traveling vehicle 10. The sign includes main signs 55 and 57 indicating speed regulation and cancellation, and auxiliary signs 54 and 56 indicating conditions of the main signs 55 and 57. The auxiliary signs 54 and 56 include characters and symbols such as arrows, and cannot be determined unless character recognition is performed correctly. For example, the auxiliary signs 54 and 56 must be able to accurately recognize "excluding large cargo and the like, and three-wheel towing" in order to determine to which an ordinary car belong. Therefore, correct character recognition at a long distance is one of the reasons why a high-resolution 4K or 8K camera is required.

A high-resolution image is necessary for determining the character recognition of the auxiliary signs 54 and 56, but the background portion such as a mountain or a guardrail does not need high resolution. Therefore, a high-resolution image of a limited region for detailed recognition, and a low-resolution whole image with a reduced resolution or a high-resolution whole image with a reduced frame rate, which serves as information on the entire screen are used. Thus, it is possible to reduce the data transmission amount as compared with the data transmission amount of the high-resolution whole image at a normal frame rate.

As illustrated in FIG. 2, it is assumed that a radar 4 mounted in the traveling vehicle 10 detects a certain distant three-dimensional object at a time T in a direction of a distance d1 [m] and an angle θ1. Since the vehicle 10 travels at a vehicle speed [km/h], it is predicted that a camera 3 is capable of capturing the distant three-dimensional object at a time (T+ΔT) and an angle φ1 or at a distance d2 [m]. Therefore, if a control unit 2 outputs a request to the camera 3 in advance, so as to cut out an image of the angle φ1 or the distance d2 [m] at the time (T+ΔT), when the time (T+ΔT) comes, the camera 3 transfers a whole image and a high-resolution image being a cutout image of only a partial image, to the control unit 2.

Here, in FIG. 2, the angle φ1 is described, but when the coordinate system on the drawing is different from the coordinate system of the camera 3, it is necessary to notify the camera 3 of an angle obtained by matching with the coordinate system of the camera 3. The control unit 2 includes, for example, the recognition unit 41 including a DNN (Deep Neural Network). A high-resolution partial image is input to the recognition unit 41 to perform character recognition.

Since the cut-out position of the image of the camera 3 is specified by using the information of other sensors such as the radar 4, which is input to the control unit 2, as described above, for example, the radar 4 having a longer detection distance than the camera 3 can notify the camera 3 from the control unit 2 by using the information of the distance and the time that cannot be detected by the camera 3, and thus can cut out the high-resolution partial image immediately when the camera 3 can acquire an effective image.

Figure 3:
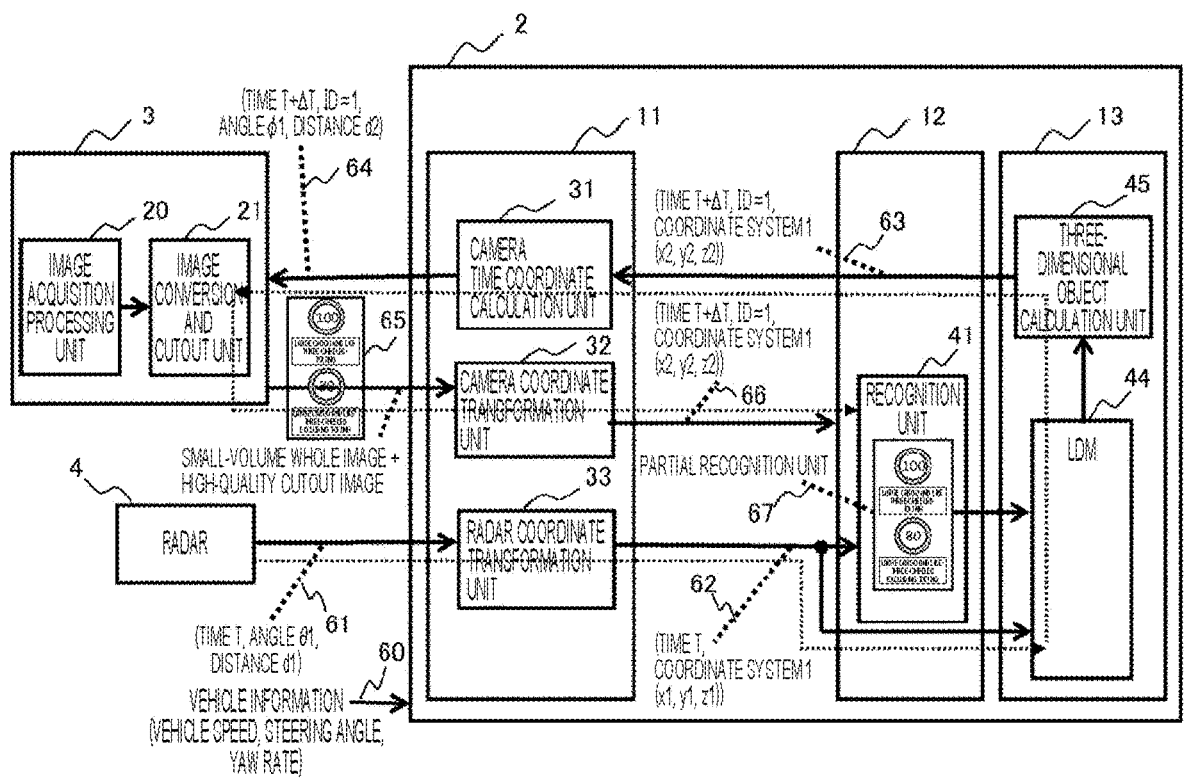
FIG. 3 is a diagram illustrating a data flow between a radar and a camera.

FIG. 3 is a diagram illustrating a data flow between the radar 4 and the camera 3. The sign recognition processing illustrated in FIG. 2 will be described with reference to FIG. 3.

Firstly, the radar 4 detects a distant three-dimensional object in the coordinate system of the radar 4 (time T, angle θ1, distance d1) 61 and outputs the detection result. The detection result is input to the control unit 2 and transformed by the radar coordinate transformation unit 33 into the global coordinate system (also referred to as Coordinate system 1), output in a form of (time T, Coordinate system 1 (x1, y1, z1)) 62, and input to the three-dimensional object calculation unit in the analyzing unit 13.

If a region in which the camera 3 can discriminate a three-dimensional object with sufficient resolution is referred to as an effective region of the camera 3, the three-dimensional object calculation unit 45 calculates the time and the position at which the three-dimensional object appears in the effective region of the camera 3. The three-dimensional object calculation unit uses vehicle information 60 indicating a host vehicle action such as the vehicle speed, the steering angle, and the yaw rate, which is input to the control unit 2 via a CAN, the time T of information in the vehicle coordinate system of the radar 4, and Coordinate system 1 (x1, y1, z1)) 62 to calculate a plurality of times and coordinates in Coordinate system 1 in accordance with the frame rate intervals of the camera 3. Here, (time (T+ΔT), identifier ID=1, Coordinate system 1 (x2, y2, z2)) 63 is set as the coordinates of the first point among a plurality of points.

The camera time coordinate calculation unit 31 transforms the vehicle coordinate system to the coordinate system (time (T+ΔT), angle φ1, distance d2) 64 of the camera 3. The angle indicates the angle of the polar coordinate system, and the distance indicates the distance from the camera 3. For cameras 3 such as a stereo camera that can handle the distance, distance information is also output. The time information may be notified by time or frame number.

If the camera 3 is a camera 3 such as a stereo camera, which can handle the distance using parallax, an image conversion cutout unit 21 creates a high-resolution image cutout 65 and a small-volume whole image based on the time, the angle, and the distance. The small-volume whole image may be either a low-resolution whole image obtained by down-converting the image, or a high-resolution whole image data with a low frame rate by thinning out specific frames.

The camera coordinate transformation unit 32 transforms the raw data image output from the camera 3 into the vehicle coordinate system. The cutout image 65 is transformed into the vehicle coordinate system and handled as (time (T+ΔT), Coordinate system 1 (x2, y2, z2)) 66. Then, the partial recognition unit 43 in the recognition unit 41 performs recognition processing on the cutout image portion to recognize and identify the main sign and the auxiliary sign.

Figure 4:
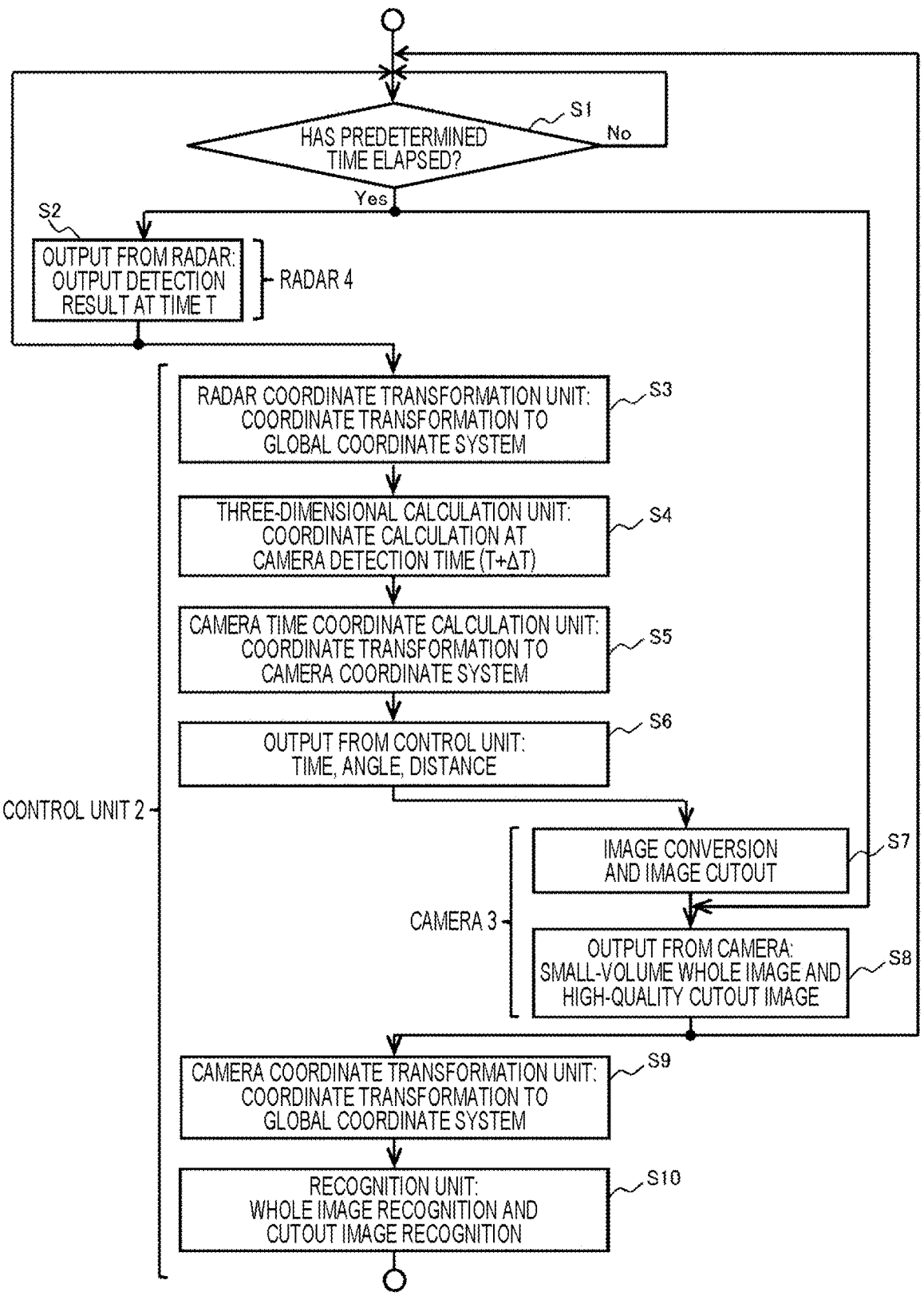
FIG. 4 is a flowchart illustrating recognition processing in the first embodiment.

FIG. 4 is a flowchart of the recognition processing in the first embodiment.

In FIG. 4, the processes S1, S3 to S6, S9, and S10 are processes of the control unit 2, the process S2 is a process of the radar 4, and the processes S7 and S8 are processes of the camera 3.

In the process S1, it is determined whether or not a certain time has elapsed. When the certain time has elapsed, the process proceeds to the processes S2 and S8. In the process S2, detection coordinates of one or a plurality of three-dimensional objects including sign candidates far from the radar 4 are output to the control unit 2 from the radar 4 at the time T. In addition, in the process S8, the image data of the small-volume whole image of raw data and the image data of the high-resolution cutout image are output from the camera 3 to the control unit 2.

When the detection coordinates from the radar 4 are output in the process S2, in process S3, the radar coordinate transformation unit 33 in the control unit 2 performs coordinate transformation from the detection coordinates in the radar 4 to the coordinates in the global coordinate system. Then, the process proceeds to the process S4.

In the process S4, the radar 4 can detect a farther distance than the camera 3. Thus, the time when the camera 3 can handle the three-dimensional object as an effective image, for example, when the width of the image of the three-dimensional object corresponds to a specific number of pixels advances from the detection time (T) in the radar 4. The three-dimensional object calculation unit 45 calculates the vehicle action from the vehicle speed, the steering angle, and the yaw rate. Then, the three-dimensional object calculation unit calculates the time (T+ΔT) and the coordinates (x2, y2, z2) when the three-dimensional object enters into a region, on the global coordinate system based on the detection coordinates of the three-dimensional object in the radar 4, which is obtained by being transformed into the global coordinate system in the process S3. This region is a region which is defined in advance in the system and is handled as the effective image by the camera 3.

Then, in the process S5, the camera time coordinate calculation unit 31 performs coordinate transformation of the coordinates (x2, y2, z2) of the three-dimensional object at the time (T+ΔT) calculated in the process S4 from the global coordinate system into the camera coordinate system. For example, if the camera 3 has polar coordinates, transformation into the polar coordinates is performed. If the distance can be handled as in the stereo camera, the distance from the camera 3 is also calculated.

In the next process S6, depending on information that can be handled by the camera 3, the control unit 2 outputs, to the camera 3, time information of the time (T+ΔT) calculated in the process S4 and coordinate information (angle, distance) of the three-dimensional object at the time (T+ΔT) in which the coordinates is transformed from the global coordinate system into the camera coordinate system in the process S5. The time may be defined by an absolute time or a frame number.

In the camera 3, in the process S7, the image conversion cutout unit 21 in the camera 3 captures a three-dimensional object using the time information and the coordinate information received from the control unit 2, and cuts out a high-resolution image of a portion near the coordinates of the three-dimensional object. Furthermore, the image conversion cutout unit generates the whole image obtained by reducing the resolution of the whole image, lowering the frame rate, and reducing the data volume.

Then, in the process S8, the small-volume whole image to which the time information is added and the high-resolution cutout image to which the time information and the coordinate information are added are output from the camera 3 to the control unit 2. The camera 3 may not necessarily output all the images in an image capturing region as the whole image. An image obtained by capturing a range which is at least wider than the high-resolution cutout image obtained by cutting out the vicinity portion of the three-dimensional object can be output as the whole image.

In the process S9, the control unit 2 causes the camera coordinate transformation unit 32 to transform the received cutout image into the global coordinate system.

Then, in the next process S10, in the recognition unit 41 of the control unit 2, the whole recognition unit 42 recognizes the whole image, and the partial recognition unit 43 recognizes the cutout image. The partial recognition unit 43 may perform rectangular recognition of the three-dimensional object or different type of recognition from a lane, such as character recognition of an auxiliary sign.

(Coordinate Transformation for Single-Lens Camera)

The coordinate transformation of the radar coordinate system of the radar 4, the global coordinate system of the control unit 2, and the camera coordinate system of the camera 3 in the first embodiment will be described with reference to FIGS. 5 to 10 by using a case of the single-lens camera as an example.

Figure 5:
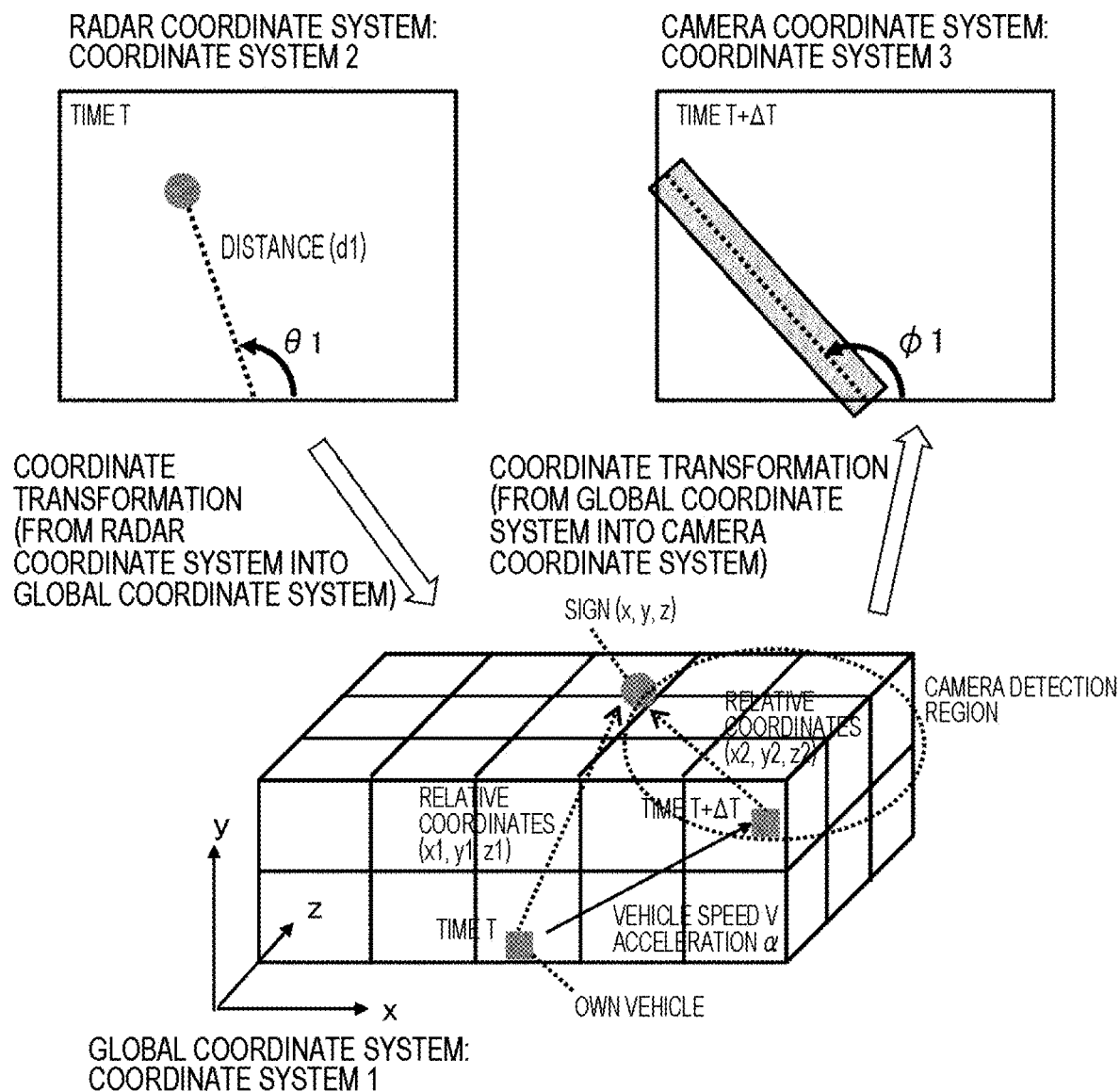
FIG. 5 is a diagram illustrating an example of relative coordinate calculation for sign recognition and coordinate transformation fora single-lens camera in the first embodiment.

FIG. 5 illustrates an example of using the detection information of the sign by the radar 4 to calculate the relative coordinates of the sign and the camera 3 at the time (T+ΔT) and to perform transformation into the camera coordinate system of the single-lens camera.

Firstly, it is assumed that a sign is detected from the host vehicle at a time T, a distance (d1), and an angle (81) in the radar coordinate system of the radar 4. The radar coordinate transformation unit 33 transforms the radar coordinate system to the global coordinate system. Since the control unit 2 knows the global coordinates of the time T of the host vehicle, the control unit can plot the coordinates (x, y, z) of the sign by using the transformed relative coordinates (x1, y1, z1). The host vehicle can calculate the coordinates at a time (T+ΔT) using the vehicle information such as the vehicle speed V and the acceleration a. The relative coordinates (x2, y2, z2) are calculated from the coordinates (x, y, z) of the sign and the coordinates of the host vehicle at the time (T+ΔT). At this time, it is assumed that, at the time (T+ΔT), the camera 3 is in a region in which the camera 3 can be detected from, the distance in relative coordinates between the host vehicle and the sign.

Then, when the relative coordinates (x2, y2, z2) in the global coordinate system are transformed into the camera coordinate system, the coordinates are represented in the direction of the angle φ1 at the time (T+ΔT).

Figure 6:
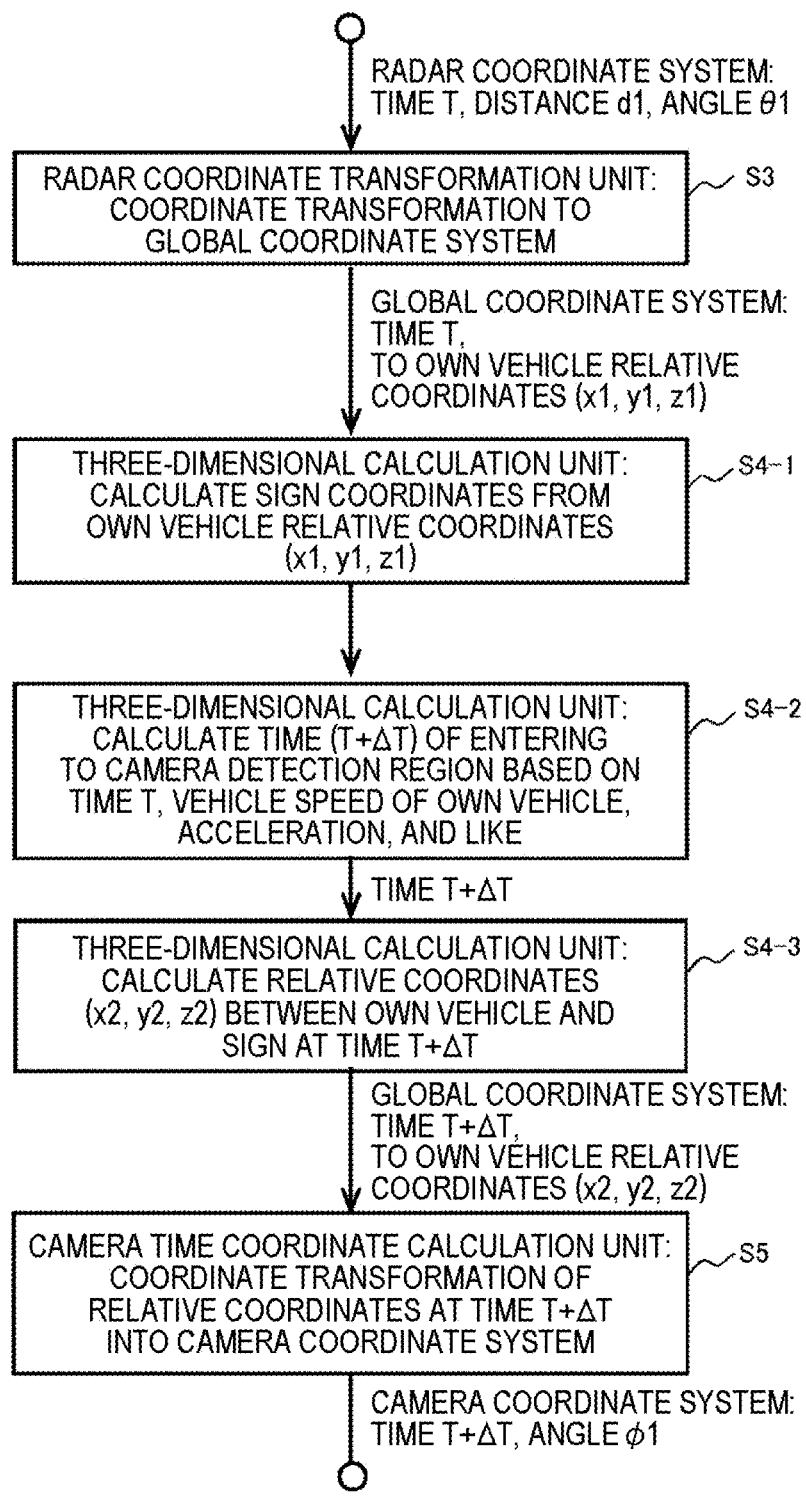
FIG. 6 is a flowchart illustrating the relative coordinate calculation for sign recognition and the coordinate transformation processing for the single-lens camera in the first embodiment.

FIG. 6 is a flowchart illustrating coordinate transformation processing for the camera coordinate system of the single-lens camera illustrated in FIG. 5. FIG. 6 illustrates details of the process S4 by the three-dimensional object calculation unit 45 in the flowchart illustrated in FIG. 4.

In the process S3, as described above with reference to FIG. 4, the radar coordinate transformation unit 33 in the control unit 2 performs coordinate transformation of the detection coordinates (time T, distance d1, angle θ1) in the radar 4 into the coordinates (time T, relative coordinates (x1, y1, z1) to the host vehicle) in the global coordinate system.

In the next process S4-1 illustrated in FIG. 6, at the time T, the sign coordinates (x, y, z) is calculated by adding the relative coordinates (x1, y1, z1) to the host vehicle, to the position of the host vehicle.

Then, in the process S4-2, the position of the host vehicle at a certain time is predicted from the vehicle information (vehicle speed, acceleration, steering angle, and the like) of the host vehicle. Since the sign coordinates (x, y, z) are fixed, if the detection distance of the camera 3 is set to, for example, 100 m, the predicted time to enter to a point with a radius of 100 m from the sign coordinates can be calculated.

This time is T+ΔT. It is also possible to normalize the time to the frame period of the camera 3.

In the next process S4-3, when the time (T+ΔT) is set, the position of the host vehicle can be predicted from the vehicle information. Thus, the difference between the predicted coordinates of the host vehicle and the fixed sign coordinates is calculated, and the relative coordinates (x2, y2, z2) at the time (T+ΔT) are calculated.

In the process S5, the relative coordinates (x2, y2, z2) to the vehicle at the time (T+ΔT) are obtained. Thus, the time (T+ΔT) and the angle θ are calculated by performing coordinate transformation into the camera coordinate system.

(Width of Image to be Cut Out in Case of Single-Lens Camera)

Next, how to determine the width w' of an image to be cut out by the camera 3 in the first embodiment will be described.

Figure 7:
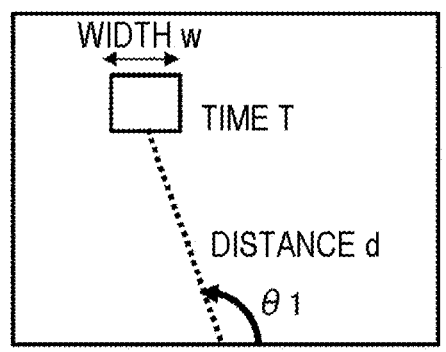
FIG. 7 is a diagram illustrating an example of designating an image width for the single-lens camera in the first embodiment.
Figure 7:
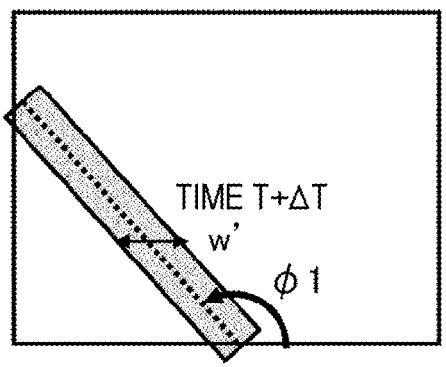

FIG. 7 is a diagram illustrating an example of designating an image width for the single-lens camera in the first embodiment. As illustrated in FIG. 7, it is assumed that the width of a sign (three-dimensional object) detected at the time T, the distance d, and the angle θ1 by the radar 4 is w. When the camera 3 detects the sign (three-dimensional object) at the time (T+ΔT), the radar 4 and the camera 3 have different detection times. Thus, not only the angle and distance to the sign (three-dimensional object) but also the width w' are different.

When the width of the three-dimensional object is determined, the relation between the distance and the width (number of pixels) of the camera image can be represented as a table. FIG. 8 is a diagram illustrating an example of the table of distances and pixel widths of camera images. As illustrated in FIG. 8, when the width of a certain fixed sign is determined, the number of pixels of the image width corresponding to the distance is shown. The reference is made based on the distance from this table, and if an appropriate distance is not in the table, linear interpolation is performed for calculation. As another means, the calculation may be performed based on the following formula (1) from the relation between the width of the radar 4, the radar distance, and the camera distance.

$$Wc = Wr \times (Dr/Dc) \times K \qquad \text{Formula (1)}$$

Here, Wc: camera width, Wr: radar width, Dr: radar distance, Dc: camera distance, K: coefficient.

The camera time coordinate calculation unit 31 calculates the width w' in the image of the camera with reference to the table illustrated in FIG. 8 or the formula (1).

(Cutting-Out of Image for Single-Lens Camera)

How the single-lens camera cuts out an image in the first embodiment will be described.

Figure 9:
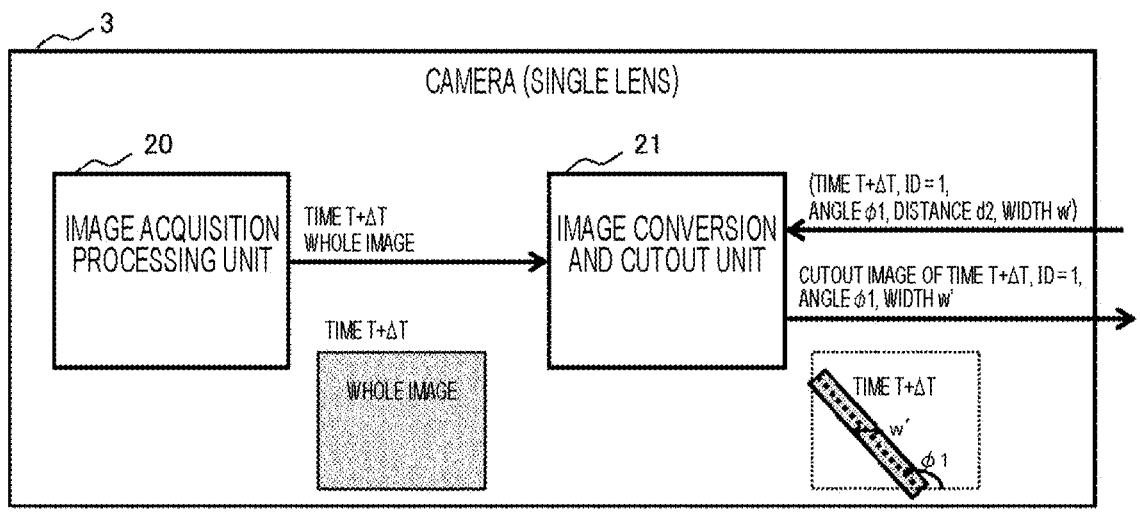
FIG. 9 is a diagram illustrating image cutout by the single-lens camera in the first embodiment.

FIG. 9 is a diagram illustrating image cutout by the single-lens camera. From the control unit 2, information of the time (T+ΔT), the angle the distance d2, the width w', and the identifier ID=1 is received as information of the cutout image. An image acquisition processing unit 20 generates the whole image for each frame. The image conversion cutout unit 21 generates a cutout image in addition to the low-resolution whole image or the whole image by thinned frames using only some frames. Since the single-lens camera does not have the distance information, the distance information is not used. In accordance with an instruction from the control unit 2, a cutout image is generated from the whole image at the time (T+ΔT), with the angle φ1 and the width w'.

Figure 10:
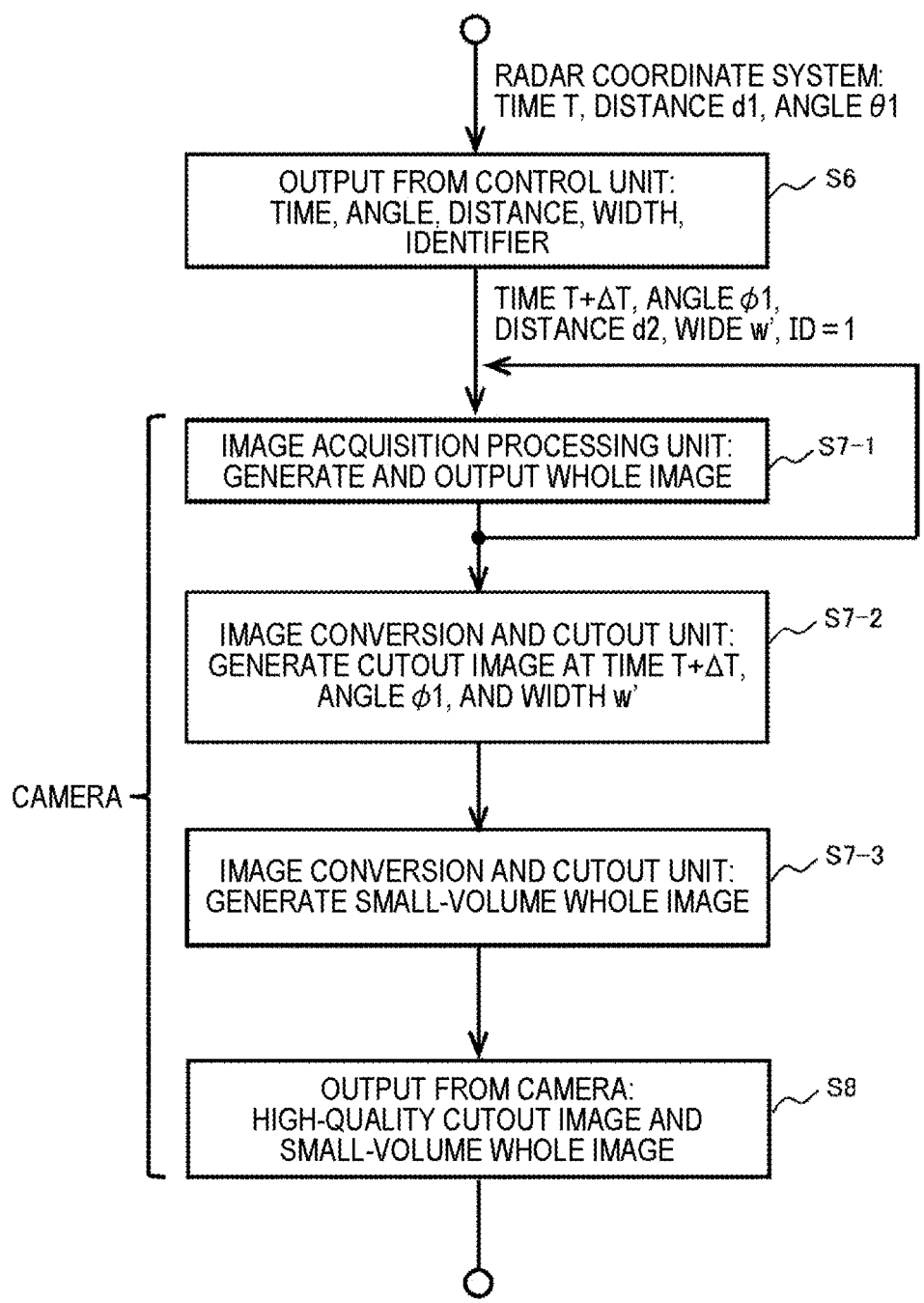
FIG. 10 is a flowchart illustrating processing of cutting out an image by the single-lens camera in the first embodiment.

FIG. 10 is a flowchart illustrating processing of cutting out an image by the single-lens camera. This flowchart illustrates details of the process S7 in FIG. 4.

In the process S6, the control unit 2 outputs the information of the time (T+ΔT), the identifier ID=1, the angle 41, the distance d2, and the width w' as the information of the cutout image, as a manner similar to the above description with reference to FIG. 4.

Next, in process S7-1, the image acquisition processing unit 20 generates a whole image for each frame and outputs it. In the next process S7-2, the image conversion cutout unit 21 generates a cutout image with the angle φ1 and the width w' from the whole image at the time (T+ΔT). Then, in the process S7-3, as a small-volume whole image, a whole image obtained by down-converting the image is generated for each frame, or a whole image in thinned frames using only some frames is generated. In the next process S8, the high-resolution cutout image generated in the process S7-2 and the small-volume whole image generated in the process S7-3 are output from the camera 3.

(Coordinate Transformation for Stereo Camera)

The coordinate transformation of the radar coordinate system of the radar 4, the global coordinate system of the control unit 2, and the camera coordinate system of the camera 3 in the first embodiment will be described with reference to FIGS. 11 to 18 by using a case of a stereo camera as an example.

Figure 11:
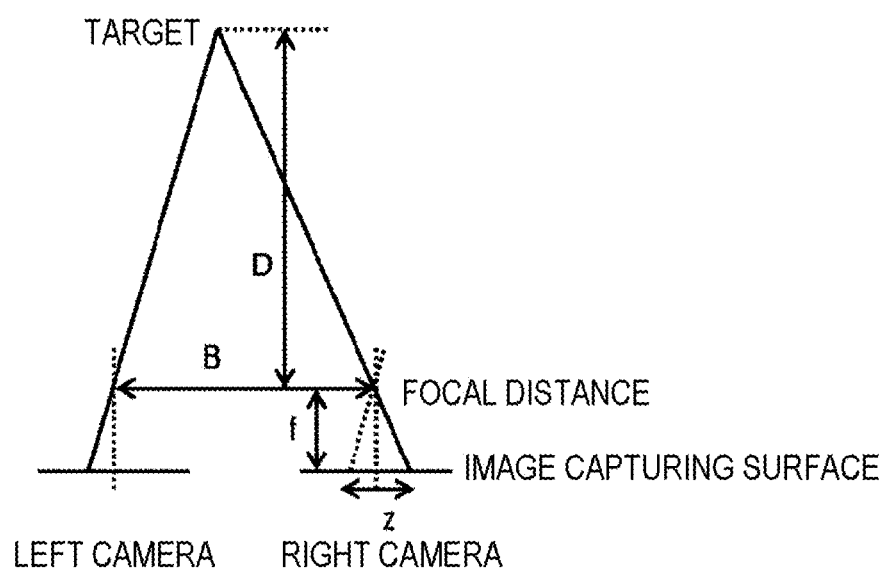
FIG. 11 is a diagram illustrating the principle of a stereo camera.

FIG. 11 is a diagram illustrating the principle of the stereo camera. A distance distribution image is generated on the entire screen based on the positional deviation (parallax) of the left and right imaging surfaces of the cameras 3. The distance D is calculated by the formula (2).

$$D = B \times f / Z \quad \text{Formula (2)}$$

Here, D: distance, B: base line length of the camera, f: camera focal length, and Z: positional deviation of imaging surface.

Figure 12:
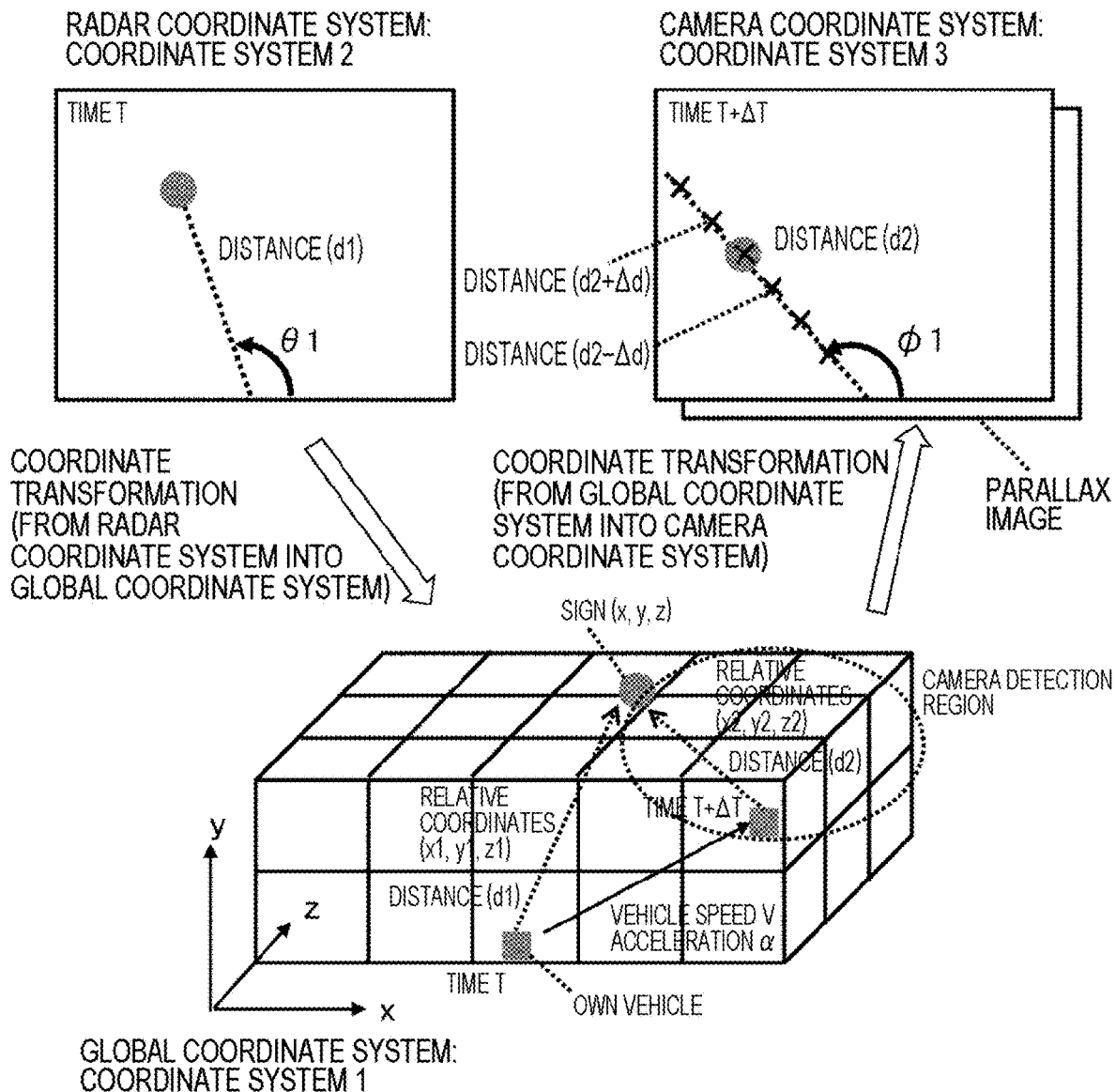
FIG. 12 is a diagram illustrating an example of relative coordinate calculation for sign recognition and coordinate transformation for the stereo camera in the first embodiment.

FIG. 12 illustrates an example of using the detection information of the sign by the radar 4 to calculate the relative coordinates of the sign and the camera 3 at the time (T+ΔT) and to perform transformation into the camera coordinate system, of the stereo camera. The stereo camera is different from, the single-lens camera illustrated in FIG. 5 in that the camera 3 handles the distance of the sign.

Firstly, it is assumed that a sign is detected at a time T, a distance (d1), and an angle (θ1) in the radar coordinate system of the radar 4. The radar coordinate transformation unit 33 transforms the radar coordinate system to the global coordinate system. Since the control unit 2 knows the global coordinates of the time T of the host vehicle, the control unit can plot the coordinates (x, y, z) of the sign by using the transformed relative coordinates (x1, y1, z1). The host vehicle can calculate the coordinates at a time (T+ΔT) using the vehicle information such as the vehicle speed V and the acceleration a. The relative coordinates (x2, y2, z2) are calculated from the coordinates (x, y, z) of the sign and the coordinates of the host vehicle at the time (T+ΔT). At this time, it is assumed that, at the time (T+ΔT), the camera 3 is in a region in which the camera 3 can be detected from the distance in relative coordinates between the host vehicle and the sign.

Then, when the relative coordinates (x2, y2, z2) in the global coordinate system are transformed into the camera coordinate system, the coordinates are represented in the direction of the angle φ1 at the time (T+ΔT). The stereo camera has a parallax image indicating the distance in pixel units, and the distance can be known in pixel units. Therefore, the partial image at the distance (d2) can be derived by superimposing the parallax image on the portion of the image at the angle φ1.

(Width of Image to be Cut Out in Case of Stereo Camera)

How to determine the width w' of the image cut out by the stereo camera in the system of the first embodiment will be described.

Figure 13:
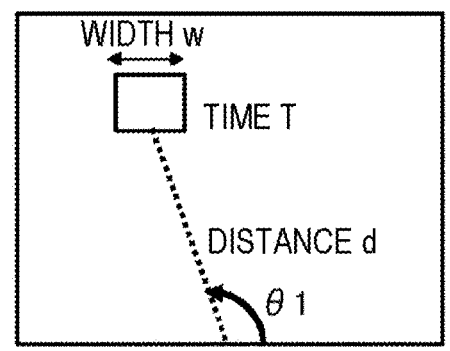
FIG. 13 is a diagram, illustrating an example of designating an image width for the stereo camera in the first embodiment.
Figure 13:
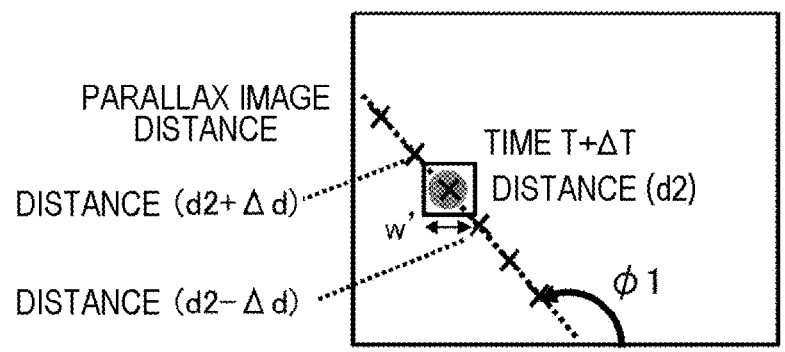

FIG. 13 is a diagram illustrating an example of designating the image width for the stereo camera in the first embodiment. As illustrated in FIG. 13, it is assumed that the width of a sign (three-dimensional object) detected at the time T, the distance d, and the angle θ1 by the radar 4 is w. When the camera 3 detects the sign (three-dimensional object) at the time (T+ΔT), the radar 4 and the camera 3 have different detection times. Thus, not only the angle and distance to the sign (three-dimensional object) but also the width w' are different.

When the width of the three-dimensional object is determined, the relation between the distance of the camera image and the width (number of pixels) may be represented as the table as illustrated in FIG. 8, or may be calculated from the width of the radar 4, the radar distance, and the camera distance as in the formula (1). The camera time coordinate calculation unit 31 calculates the width w' in the image of the camera with reference to the table illustrated in FIG. 8 or the formula (1).

(Cutting-Out of Image in Case of Stereo Camera)

How the stereo camera cuts out an image in consideration of the distance in the first embodiment will be described.

Figure 14:
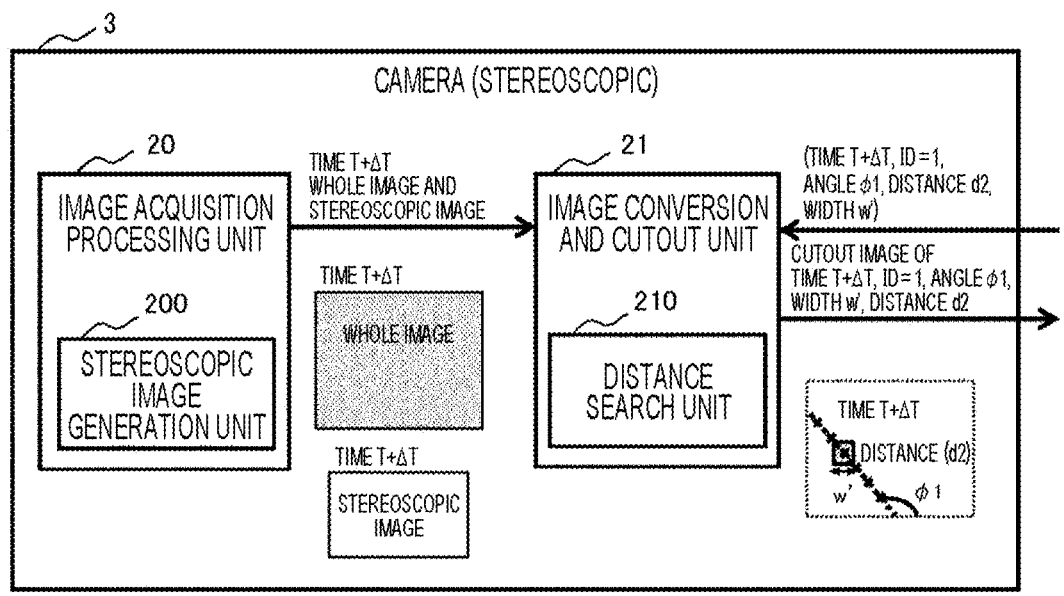
FIG. 14 is a diagram illustrating image cutout by the stereo camera in the first embodiment.

FIG. 14 is a diagram illustrating image cutout by the stereo camera in the first embodiment. From the control unit 2, information of the time (T+ΔT), the angle φ1, the distance d2, the width w', and the identifier ID=1 is received as information of the cutout image. An image acquisition processing unit 20 generates the whole image for each frame. A parallax image generation unit 200 generates a parallax image for each frame.

The image conversion cutout unit 21 generates a cutout image in addition to the low-resolution whole image or the whole image in thinned frames using only some frames. The whole image and parallax image at the time (T+ΔT) are used. A distance search unit 210 searches for a portion having the distance d2 in the region of the angle φ1 and determines the region having the width w' centered on the coincident point. The distance search unit cuts out a region having the distance d2 and the width w' from the whole image to generate a cutout image.

Figure 15:
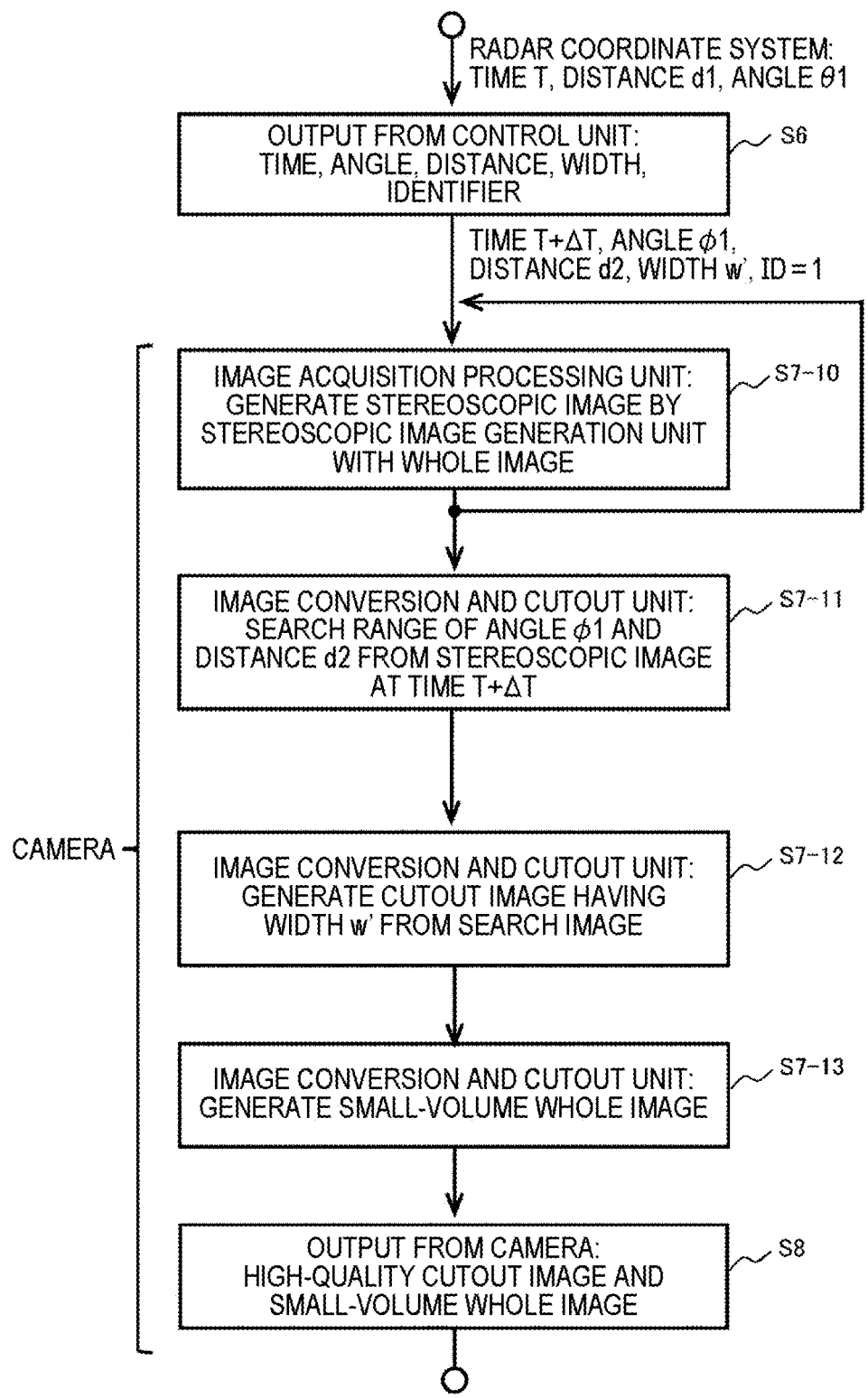
FIG. 15 is a flowchart illustrating processing of cutting out an image by the stereo camera in the first embodiment.

FIG. 15 is a flowchart illustrating processing of cutting out an image by the stereo camera. This flowchart illustrates details of the process S7 in FIG. 4.

In the process S6, the control unit 2 outputs the information of the time (T+ΔT), the identifier ID=1, the angle φ1, the distance d2, and the width w' as the information of the cutout image, as a manner similar to the above description with reference to FIG. 4.

Then, in the process S7-10, the image acquisition processing unit 20 generates and outputs the whole image, and the parallax image generation unit 200 generates and outputs the parallax image, for each frame. In the next process S7-11, in the image conversion cutout unit 21, the distance search unit 210 searches the parallax image at the time (T+ΔT) for a range having the distance d2 at the angle φ1 to find a region. Then, in the process S7-12, a cutout image having a width w' for this region is generated from the whole image. In the next process S7-13, as a small-volume whole image, a whole image obtained by down-converting the image is generated for each frame, or a whole image in thinned frames using only some frames is generated. Then, in the process S8, the high-resolution cutout image generated in the process S7-12 and the small-volume whole image generated in the process S7-13 are output from the camera 3.

As described above, a cutout image having the angle ϕ1 and the width is generated at a specific time (T+ΔT) in the case of the single-lens camera, and a cutout image further including the distance d2 is generated in the case of the stereo camera.

According to the first embodiment, it is possible to reduce a transmission band in transmission of image data captured from a traveling vehicle and to reduce system cost without a need for an expensive cable or an expensive communication component.

Second Embodiment

In a second embodiment, in contrast to the first embodiment, an example of determining whether a three-dimensional object detected by the radar 4 is a moving object or a stationary object and then changing the size or the transmission interval of an image cut out from the camera 3, between the moving object and the stationary object, will be described.

The three-dimensional object initially recognized by the radar 4 is tracked for a predetermined period, and comparison with vehicle information such as the vehicle speed, the steering angle, and the yaw rate is performed. When the corresponding three-dimensional object moves in coordinates depending on the moving amount of the vehicle, the three-dimensional object can be determined to be a stationary object. When the corresponding three-dimensional object moves by a moving amount different from the moving amount of the host vehicle, the three-dimensional object can be determined to be a moving object.

In the case of a moving object, a cutout image by the camera 3 is generated based on the moving amount of the corresponding three-dimensional object. A margin may be included, for example, by increasing the image size. Since the stationary object only moves by the movement of the host vehicle, the margin for the image size may be set to be small. The transmission interval of the cutout image from the camera 3 to the control unit 2 may be set to be short for the moving object and may be set to be long for the cutout image of the stationary object.

For example, the moving object may be cut out every frame, but the stationary object may be cut out every few frames.

Figure 16:
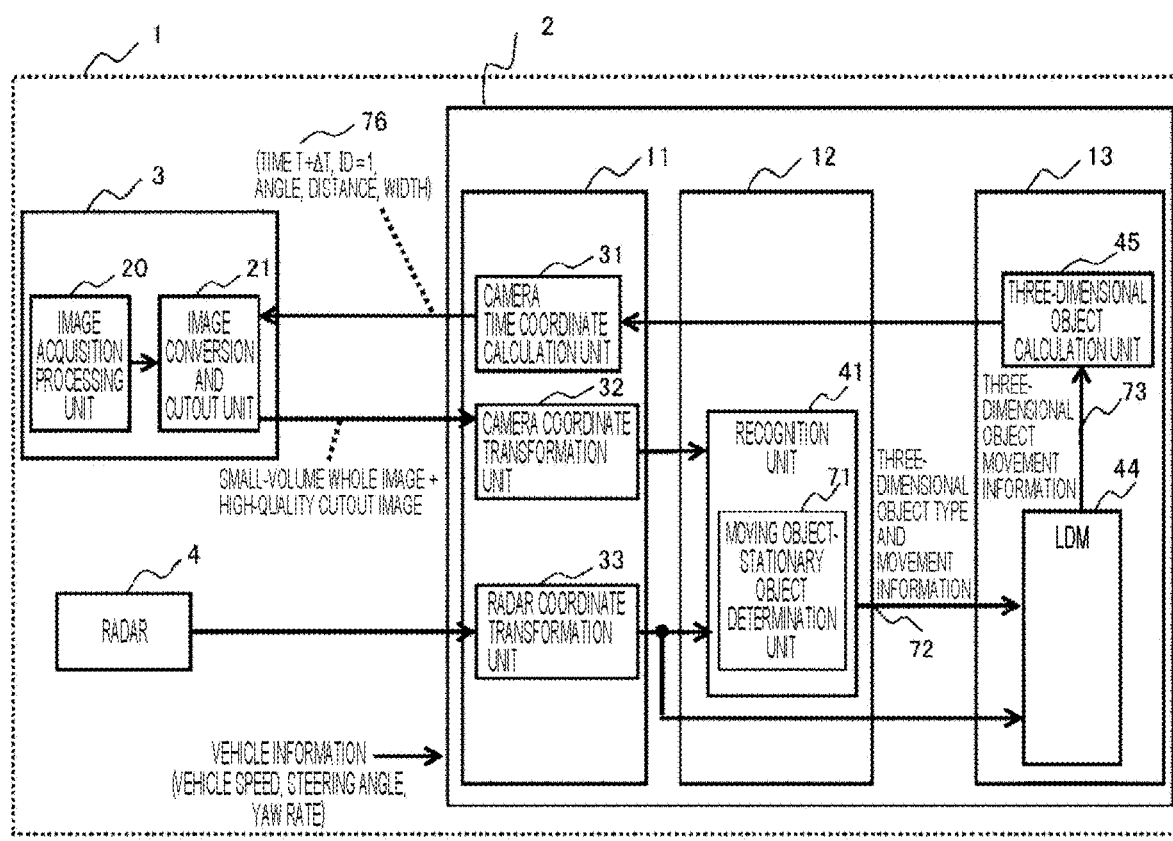
FIG. 16 is a block diagram illustrating a configuration of a vehicle equipped with an in-vehicle electronic control device according to a second embodiment.

FIG. 16 is a block diagram illustrating a configuration of a vehicle equipped with an in-vehicle electronic control device 1 in the second embodiment. The same components as those in the first embodiment are denoted by the same reference signs, and the description thereof will not be repeated.

Differing from the first embodiment, a moving object-stationary object determination unit 71 is provided in the recognition unit 41. The moving object-stationary object determination unit 71 tracks the detection result of the radar 4 to perform determination of a moving object or a stationary object from the difference from movement information of the host vehicle, and calculates the relative speed and direction of the moving object to the host vehicle.

The three-dimensional object calculation unit 45 determines the transmission interval of the cutout image for each of the moving object and the stationary object. In a case of the moving object, the three-dimensional object calculation unit calculates the cutout angle and distance from the relative speed and direction of the movement.

The camera time coordinate calculation unit 31 performs coordinate transformation from the vehicle coordinate system to the camera coordinate system and outputs the result of the transformation to the camera 3. The time, the identifier, the angle, the distance, and the width are transmitted to the camera 3 as instruction information 76.

The camera 3 transmits the small-volume whole image and the cut-out high-resolution image in accordance with the instruction information 76 from the control unit 2. The cutout image is generated using the angle in the single-lens camera as in the first embodiment, and using the angle and the distance information in the stereo camera.

Figure 17:
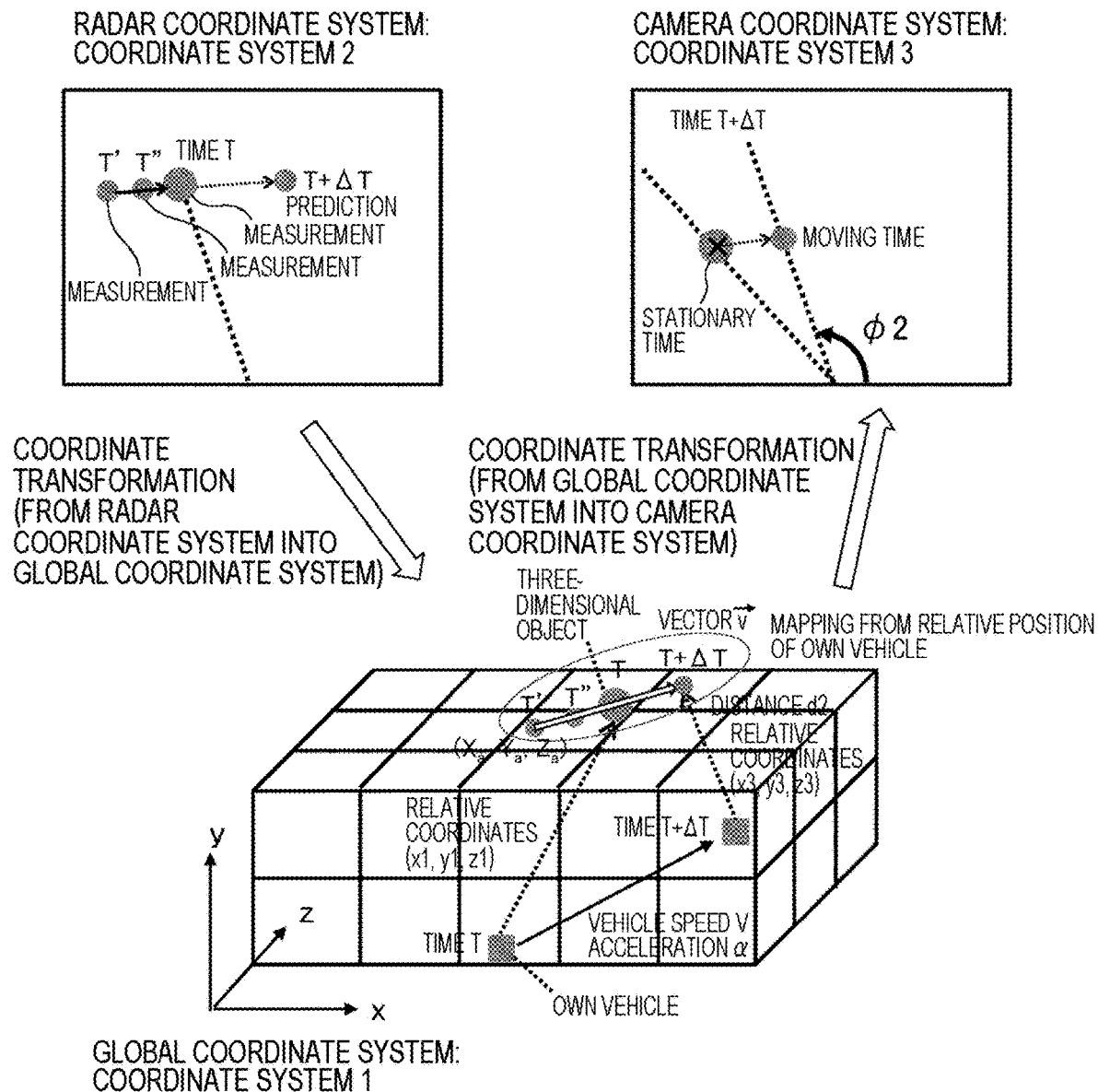
FIG. 17 is a diagram illustrating an example of relative coordinate calculation and coordinate transformation in the second embodiment.

FIG. 17 is a diagram illustrating an example of relative coordinate calculation and coordinate transformation in the second embodiment. An operation of determining whether the three-dimensional object is a moving object or a stationary object and calculating the relative coordinates to the host vehicle will be described with reference to FIG. 17. FIG. 17 illustrates that the detection information of a three-dimensional object by the radar 4 is used to determine whether or not the three-dimensional object is a moving object, to calculate the relative coordinates of the three-dimensional object and the camera 3 at the time (T+ΔT), and to perform transformation into the camera coordinate system.

Firstly, in the radar coordinate system of the radar 4, three-dimensional object information is acquired a plurality of times at a sampling cycle of the radar 4. For example, before the time T, the relative coordinates of the three-dimensional object are acquired at the times T' and T". Then, the information of the times T', T", and T is used to determine whether or not the three-dimensional object is a moving object, and to predict the relative position at the time (T+ΔT).

The radar coordinate transformation unit 33 transforms the coordinates of the three-dimensional object at the times T', T", and T detected by the radar 4 from the radar coordinate system to the global coordinate system. Since the control unit 2 knows the global coordinates of the host vehicle at each time, the control unit can plot the coordinates of the host vehicle and the coordinates of the three-dimensional object in the global coordinate system by using the relative coordinates, for example, the relative coordinates (x1, y1, z1) at the time T. Similarly, the control unit can plot the coordinates of the three-dimensional object at the times T' and T" in the global coordinate system. The control unit can calculate a vector v or a vector per unit time from the times T' and I" or from the times T" and T. Thus, the coordinates of the three-dimensional object at the time (T+ΔT) in the global coordinate system are obtained.

Since the coordinates of the host vehicle at the time (T+ΔT) in the global coordinate system are calculated using the vehicle information (vehicle speed V and acceleration a), the relative coordinates (x3, y3, z3) can be calculated from the coordinates of the three-dimensional object and the host vehicle at the time (T+ΔT). If the relative coordinates of the three-dimensional object to the host vehicle at the time (T+ΔT) are known, and the camera time coordinate calculation unit 31 performs coordinate transformation into the camera coordinate system, the angle ϕ2 is obtained.

Figure 18:
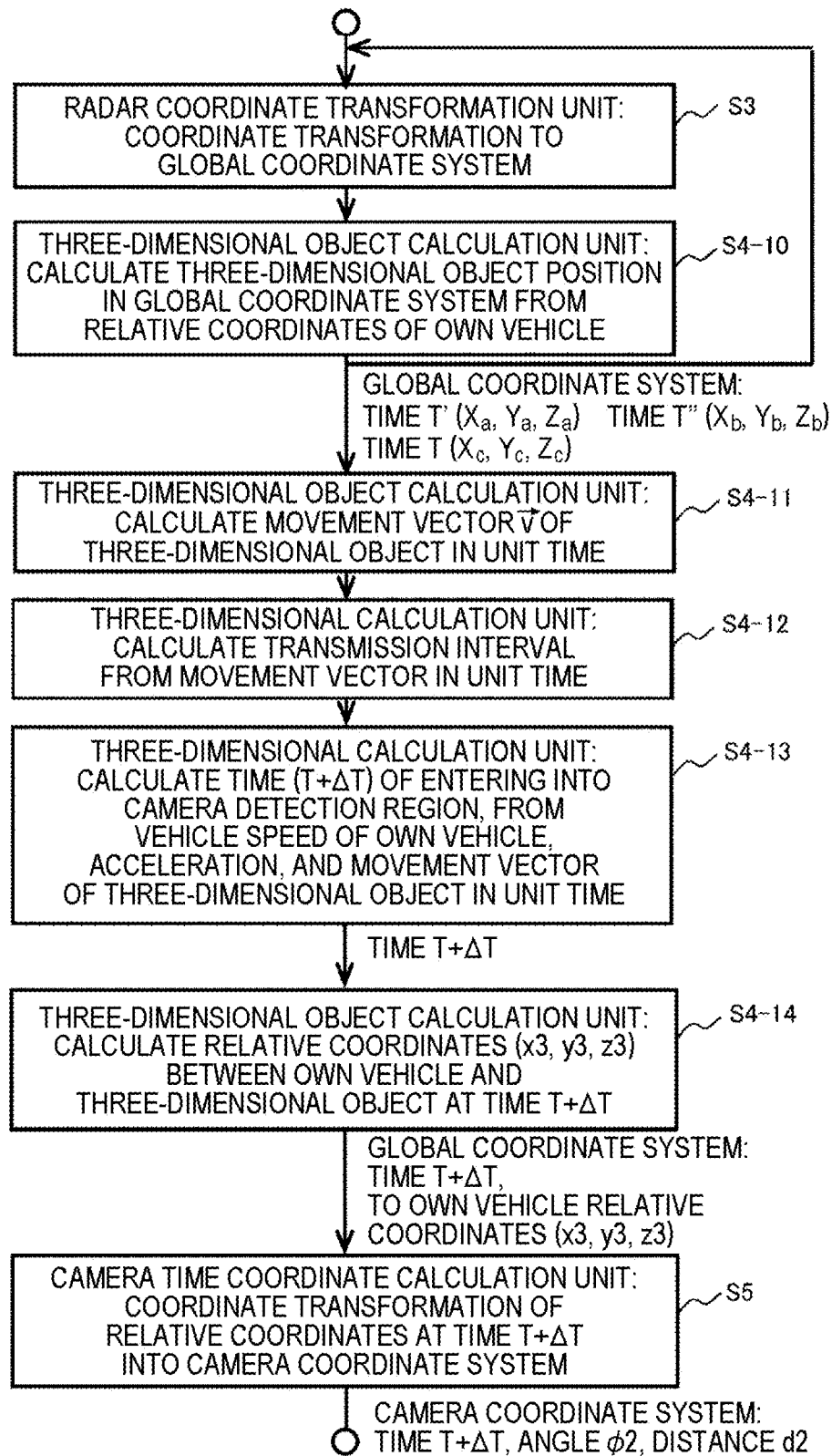
FIG. 18 is a flowchart illustrating coordinate transformation processing in the second embodiment.

FIG. 18 is a flowchart illustrating coordinate transformation processing in the second embodiment. FIG. 18 illustrates an operation of determining whether the three-dimensional object is a moving object or a stationary object and calculating the relative coordinates to the host vehicle in FIG. 17. The flowchart is obtained by adding the process for the moving object to the process S4 in the three-dimensional object calculation unit 45 in the flowchart illustrated in FIG. 4 in the first embodiment. Other processes are similar to those in the flowchart illustrated in FIG. 4.

In the process S3 of FIG. 18, the radar coordinate transformation unit 33 performs coordinate calculation for the momentary results detected by the radar 4 in the global coordinate system, in order to determine whether the three-dimensional object detected by the radar 4 is a moving object or a stationary object. Therefore, iterative processing is performed. As an example, the information at the times T', T" and is used. The radar coordinate transformation unit 33 in the control unit 2 performs coordinate transformation from the relative coordinates of the host vehicle to the three-dimensional object in the radar coordinate system at the times T' T", and T into the relative coordinates in the global coordinate system.

Regarding the position of the host vehicle, coordinate information at each of the times T', T", and T in the global coordinate system is provided. Thus, in the next process S4-10, if the difference of the coordinates of the host vehicle is taken from the relative coordinates from the host vehicle to the three-dimensional object, the coordinates of the three-dimensional object in the global coordinate system is calculated. The coordinates (Xa, Ya, Za) at the time T', the coordinates (Xb, Yb, Zb) at the time T", and the coordinates (Xc, Yc, Zc) at the time T are calculated.

Then, in the process S4-11, the three-dimensional object calculation unit 45 uses the coordinates of two points among the coordinates of three points at the times T', T", and T given as an example, to obtain a movement vector v→ per unit time, from the difference in the coordinates and the time difference.

When the movement vector v→ is zero, the three-dimensional object is a stationary object. When the movement vector v→ is not zero, the three-dimensional object is a moving object. In the process S4-12, the transmission interval is calculated such that the transmission interval of the instruction to the camera 3 is lengthened every frame for a moving object and every several frames for a stationary object.

The coordinates of the vehicle and the three-dimensional object can be predicted from the vehicle information (vehicle speed, acceleration, steering angle, and the like) of the host vehicle and the movement vector of the three-dimensional object per unit time. In the process S4-13, assuming that the detection distance of the camera 3 is, for example, 100 m, the predicted time of the vehicle entering to a point with a radius of 100 m from the predicted coordinates of the three-dimensional object is calculated. This time is T+ΔT. It is also possible to normalize the time to the frame period of the camera 3.

Then, in the process S4-14, when the time (T+ΔT) is determined, the position of the host vehicle can be predicted from, the vehicle information, and the coordinates of the three-dimensional object can be predicted from the predicted coordinates of the host vehicle and the movement vector per unit time. Thus, the relative coordinates (x3, y3, z3) of the host vehicle to the three-dimensional object are calculated by taking the difference from the coordinates.

Then, in the process S5, the camera time coordinate calculation unit 31 performs coordinate transformation of the relative coordinates (x3, y3, z3) at the time (T+ΔT) into the camera coordinate system to obtain the angle ϕ2 and the distance d2.

Although omitted in the flowchart of FIG. 18, after the time (T+ΔT), the three-dimensional object calculation unit 45 calculates the relative coordinates of the host vehicle and the three-dimensional object in accordance with the transmission interval, and the camera time coordinate calculation unit 31 performs coordinate transformation of the camera coordinate system.

According to the second embodiment, in the transmission of an image data captured from the traveling vehicle, the size and the transmission interval of the image to be cut out by the camera 3 are changed between the moving object and the stationary object. Thus, it is possible to reduce the transmission band with the control unit 2, and to reduce the system cost without a need for the expensive cable and the expensive communication component.

Third Embodiment

In the first and second embodiments, data necessary for a cutout image of the camera 3 is specified using information of a sensor such as the radar 4 other than the camera 3.

In a third embodiment, the cutout image is selected by the camera 3 without using the information of the sensors other than the camera 3.

Figure 19:
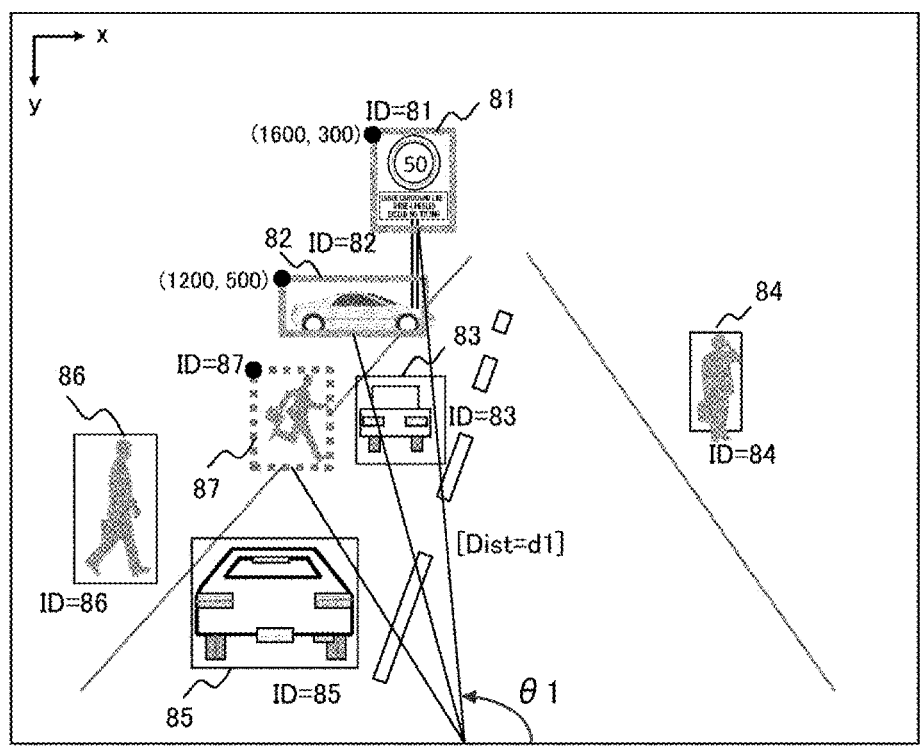
FIG. 19 is a diagram, illustrating an example of being recognized by a camera according to a third embodiment.

FIG. 19 illustrates an example of being recognized by the camera 3. The transmission amount is large if all three-dimensional objects recognized by the camera 3 are transmitted to the control unit 2. Thus, selection is performed. For example, the camera 3 selects a three-dimensional object 81 that seems to be a sign although the content is not recognizable, a vehicle 82 entering a lane, and a pedestrian 87 which is newly detected. Information of an identification ID, a time, a polar coordinates angle ϕ, and information of the distance of the three-dimensional object in the stereo camera 3, is added to a cutout image. Then, the cutout image is transmitted to the control unit 2. Regarding the three-dimensional object instructed by the camera 3 to be transmitted from the control unit 2, for example, the three-dimensional object 81 that looks like a sign and the vehicle 82 that enters the lane continuously transmit the cutout image from the camera 3. As described above, the image selected by the camera 3 and the image requested by the control unit 2 are cut out, and the cutout images are transmitted from the camera 3 to the control unit 2.

Figure 20:
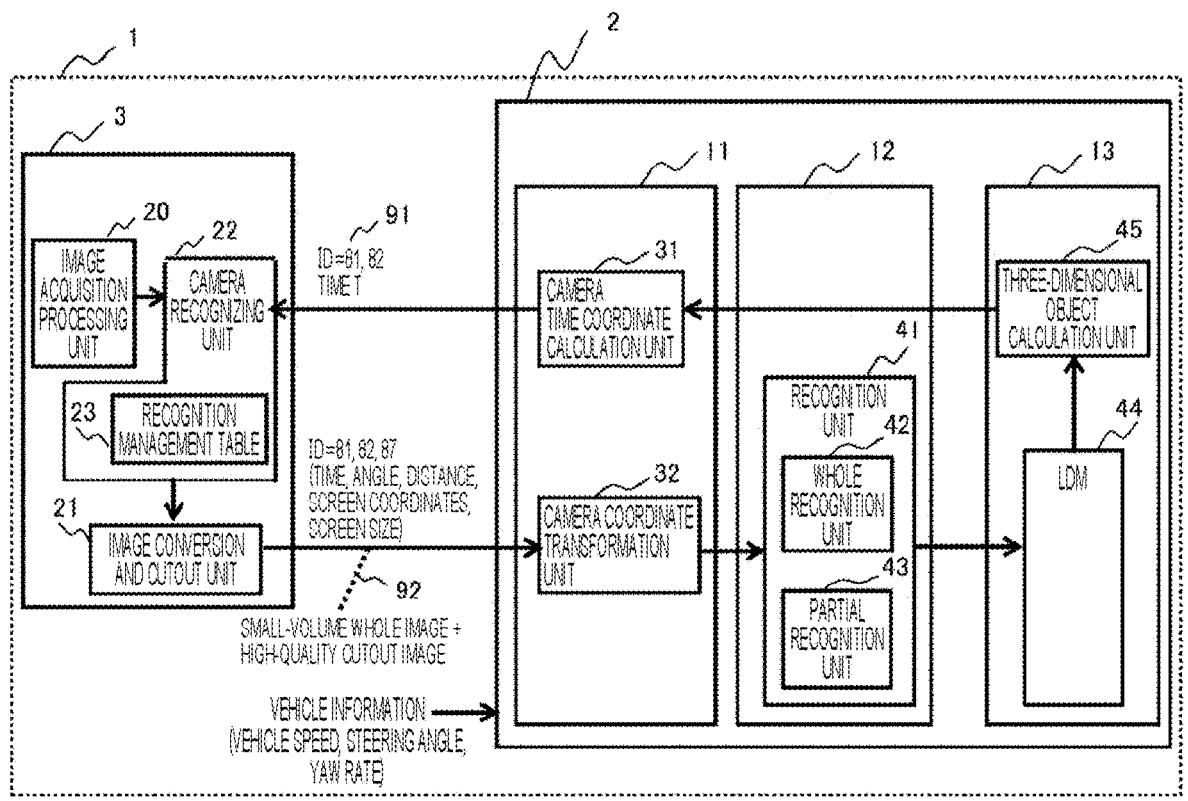
FIG. 20 is a block diagram illustrating a configuration of a vehicle equipped with an in-vehicle electronic control device in the third embodiment.

FIG. 20 is a block diagram illustrating the configuration of a vehicle equipped with the in-vehicle electronic control device 1 in the third embodiment. The same components as those in the first embodiment are denoted by the same reference signs, and the description thereof will not be repeated.

The third embodiment is different from the first and second embodiments in that, since the camera also performs recognition processing, a camera recognition unit 22 and a recognition management table 23 are provided, and both the camera 3 and the control unit 2 performs management based on a recognition ID output from the camera 3. Since the control unit 2 designates the ID to the camera 3, the camera 3 can recognize the correct position of the three-dimensional object and transmit image data of the three-dimensional object corresponding to the designated ID, by the camera recognition unit 22 tracking the three-dimensional object, even though the vehicle travels and the three-dimensional object moves.

FIG. 21 is a diagram illustrating an example of the recognition management table 23. The recognition management table 23 stores a frame number 231, a recognition ID 232, an angle 233, a distance 234, screen coordinates 235, and a screen size 236. Then, the data in the recognition management table 23 is updated every frame. In FIG. 21, for easy understanding of a change, the change is described as A→B. In practice, only data of "A" is described for the frame of the frame number 100, and only data of "B" is described for the frame of the frame number 101. The recognition ID=87 indicates a case where the record is registered first in the frame of the frame number 101 in the recognition management table 23. Further, when the vehicle is traveling, the content of information in the recognition management table 23 changes every frame.

Figure 22:
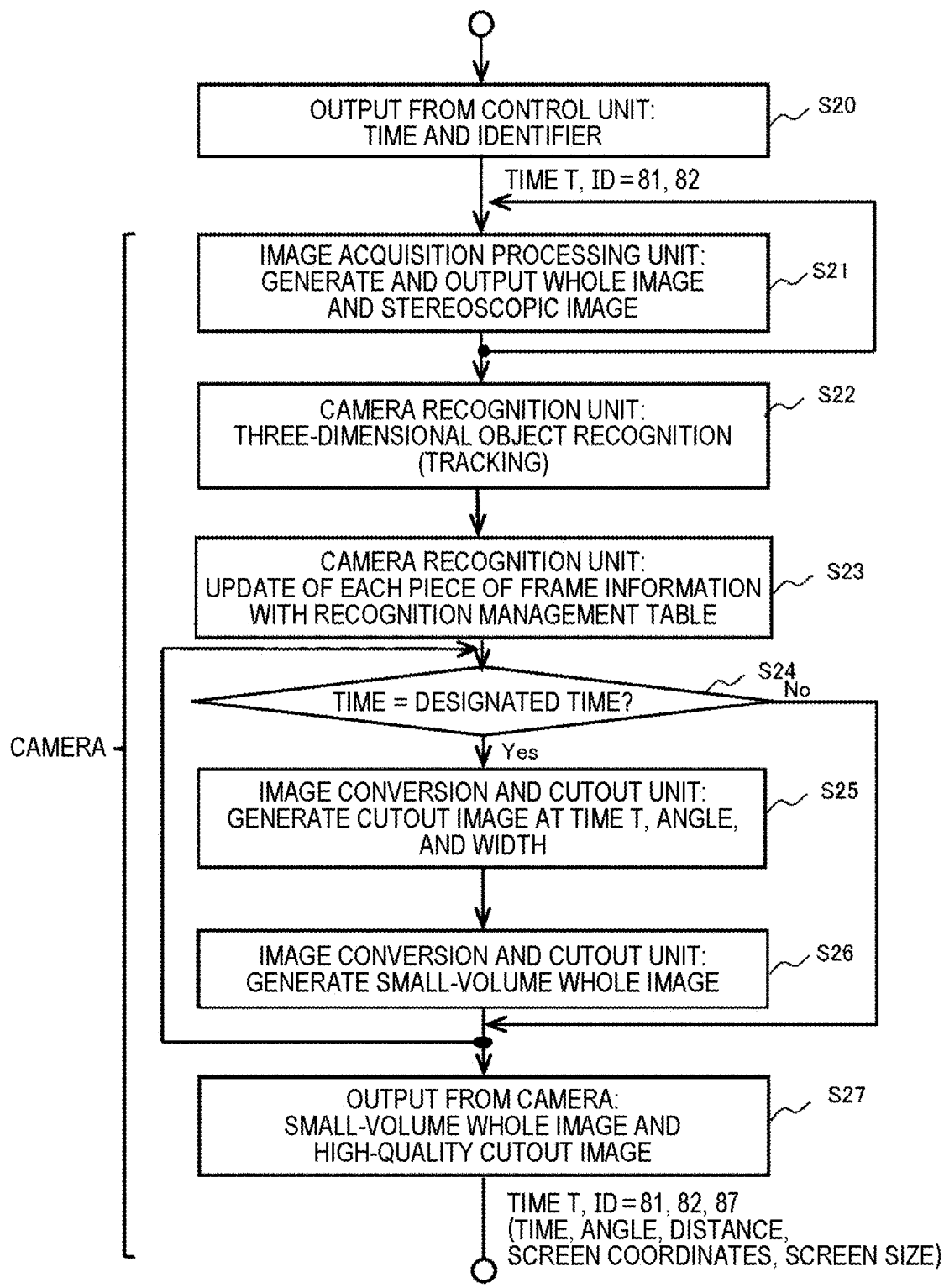
FIG. 22 is a flowchart illustrating processing of generating a cutout image by the camera in the third embodiment.

FIG. 22 is a flowchart illustrating processing of generating a cutout image by the camera 3.

In the process S20, the control unit 2 notifies the camera 3 of the time T and the recognition ID=81 and 82, as a cutout image request. In the next process S21, the image acquisition processing unit 20 in the camera 3 generates a whole image and a parallax image requested by the control unit 2 for each frame, and outputs the images to the camera recognition unit 22. Then, in the process S22, the camera recognition unit 22 performs recognition processing of a three-dimensional object, such as tracking. In the process S23, the contents of the recognition management table 23 are updated every frame based on the result of the recognition processing. Since the camera recognition unit 22 performs recognition processing of the three-dimensional object and updates the recognition management table 23, the positions of the three-dimensional object 81 and the vehicle 82 can be specified from the traveling vehicle.

In the process S24, when the control unit 2 designates the time T and the recognition ID, and the time reaches the specified time T, the process proceeds to the process S25. The image conversion cutout unit generates a cutout image of the three-dimensional object with the screen coordinates and the screen size, based on the information of the recognition management table 23.

In the process S26, as a small-volume whole image, a whole image obtained by down-converting the image is generated for each frame, or a whole image in thinned frames using only some frames is generated. Then, every time the control unit 2 designates the time T and the recognition ID, the process S24 and the subsequent processes are repeated. Then, in the process S27, the high-resolution cutout image generated in the process S25 and the small-volume whole image generated in the process S26 are output from the camera 3 with the recognition IDs added.

The control unit 2 determines whether or not there is the high-resolution partial image which is continuously required for the recognition processing of the partial recognition unit 43 in the recognition unit 41. Then, as described in the process S20, the control unit 2 notifies the camera of the recognition ID of the partial image data as a cutout image request, when it is determined that the recognition processing is continuously required.

According to the third embodiment, in the transmission of image data captured from the traveling vehicle, since it is not necessary to sequentially transmit all three-dimensional objects recognized by the camera 3 to the control unit 2, it is possible to reduce the transmission band with the control unit 2 and to reduce the system cost without a need for the expensive cable and the expensive communication component.

According to the embodiment described above, the following operational effects can be obtained.

(1) The in-vehicle electronic control device 1 includes the sensor (radar 4) that detects a three-dimensional object, the control unit 2 that obtains the position of the three-dimensional object at a predetermined time that has elapsed from a time when the sensor detects the three-dimensional object, when a vehicle travels, and the image capturing device (camera 3) that outputs image data obtained by capturing an image of the three-dimensional object to the control unit 2 at the position and the predetermined time. Thus, it is possible to reduce a transmission band in transmission of image data captured from a traveling vehicle and to reduce system cost without a need for an expensive cable or an expensive communication component.

(2) In the in-vehicle electronic control device including the image capturing device (camera 3) that captures an image of a three-dimensional object, and the control unit 2 that performs recognition processing based on image data of the three-dimensional object captured by the image capturing device, the image capturing device (camera 3) recognizes the three-dimensional object while a vehicle travels, manages image data of the recognized three-dimensional object with a corresponding identification number, when the control unit 2 performs a notification of the identification number, generates a partial image of the three-dimensional object, which corresponds to the identification number and has a high resolution, and outputs the generated image data and the identification number to the control unit 2, and the control unit 2 notifies the image capturing device (camera 3) of the identification number of the image data required for the recognition processing. Thus, it is possible to reduce a transmission band in transmission of image data captured from a traveling vehicle and to reduce system cost without a need for an expensive cable or an expensive communication component.

The present invention is not limited to the above-described embodiments, and other forms conceivable within the scope of the technical idea of the present invention are also included in the scope of the present invention as long as the characteristics of the present invention are not impaired. Further, the above-described embodiments may be combined.

REFERENCE SIGNS LIST 1 in-vehicle electronic control device
2 control unit
3 camera
4 radar
10 vehicle
11 sensor interface unit
12 integrated recognition unit
13 analyzing unit
14 route planning unit
20 image acquisition processing unit
21 image conversion cutout unit
23 recognition management table
31 camera time coordinate calculation unit
32 camera coordinate transformation unit
33 radar coordinate transformation unit
41 recognition unit
42 whole recognition unit
43 partial recognition unit 44 local dynamic map (LDM)
45 three-dimensional object calculation unit
46 route calculation unit
71 moving object-stationary object determination unit

The invention claimed is:

1. An in-vehicle electronic control device comprising:
a sensor that detects a three-dimensional object;
a control unit that obtains a position of the three-dimensional object at a predetermined time that has elapsed from a time when the sensor detects the three-dimensional object, when a vehicle travels; and
an image capturing device that outputs image data obtained by capturing an image of the three-dimensional object to the control unit at the position and the predetermined time, wherein the image capturing device generates a partial image obtained by capturing the image of the three-dimensional object and a whole image at the position and the predetermined time and outputs the image data based on the generated partial image and the whole image to the control unit, the whole image being obtained by capturing an image of a range wider than a range of the partial image and having a lower resolution or a lower frame rate than a resolution or a frame rate of the partial image.

2. The in-vehicle electronic control device according to claim 1, wherein the control unit recognizes the three-dimensional object based on the image data output by the image capturing device.

3. The in-vehicle electronic control device according to claim 1, wherein
the sensor is a radar, and outputs the time when the sensor detects the three-dimensional object and coordinates representing the position of the three-dimensional object,
the control unit obtains the coordinates of the three-dimensional object based on the time and the coordinates, which are input from the radar, after the vehicle has traveled and the predetermined time has elapsed, and
the image capturing device captures the image of the three-dimensional object by using the coordinates of the three-dimensional object after the predetermined time has elapsed.

4. An in-vehicle electronic control device comprising:
a sensor that detects a three-dimensional object;
a control unit that obtains a position of the three-dimensional object at a predetermined time that has elapsed from a time when the sensor detects the three-dimensional object, when a vehicle travels, wherein the control unit compares a moving amount of the vehicle to determine whether the three-dimensional object detected by the sensor is a moving object; and
an image capturing device that outputs image data obtained by capturing an image of the three-dimensional object to the control unit at the position and the predetermined time, wherein the image capturing device sets a transmission interval for outputting the image data obtained by capturing the image of the three-dimensional object to the control unit in accordance with whether or not the three-dimensional object is the moving object.

5. The in-vehicle electronic control device according to claim 4, wherein
the control unit compares the moving amount of the vehicle to determine whether the three-dimensional object detected by the sensor is the moving object or a stationary object,
the image capturing device reduces the transmission interval for outputting the image data obtained by capturing the image of the three-dimensional object to the control unit when the three-dimensional object is the moving object, and increases the transmission interval for outputting the image data to the control unit when the three-dimensional object is the stationary object.

6. An in-vehicle electronic control device comprising:
an image capturing device that captures an image of a three-dimensional object; and
a control unit that performs recognition processing based on image data of the three-dimensional object captured by the image capturing device,
wherein the image capturing device recognizes the three-dimensional object while a vehicle travels, manages image data of the recognized three-dimensional object with a corresponding identification number, when the control unit performs a notification of the identification number, generates a partial image of the three-dimensional object, which corresponds to the identification number and has a high resolution, and outputs the generated image data and the identification number to the control unit, and
the control unit notifies the image capturing device of the identification number of the image data required for the recognition processing.

7. The in-vehicle electronic control device according to claim 6, wherein
the image data output to the control unit by the image capturing device is raw data.

8. The in-vehicle electronic control device according to claim 6, wherein the image capturing device generates a partial image obtained by capturing the image of the three-dimensional object and a whole image and outputs the image data based on the generated partial image and whole image, to the control unit, the whole image being obtained by capturing an image of a range wider than a range of the partial image and having a lower resolution or a lower frame rate than a resolution or a frame rate of the partial image.

9. The in-vehicle electronic control device according to claim 1, wherein the image data output to the control unit by the image capturing device is raw data.

* * * * *